United States Patent [19]

Sezerman

[11] Patent Number: 4,753,510
[45] Date of Patent: Jun. 28, 1988

[54] TILT ADJUSTABLE OPTICAL FIBRE CONNECTORS

[76] Inventor: Omur M. Sezerman, 16 Sumac Trail, Narragansett, R.I. 02882

[21] Appl. No.: 847,416

[22] Filed: Apr. 3, 1986

[30] Foreign Application Priority Data

Apr. 11, 1985 [CA] Canada ..................... 478876

[51] Int. Cl.$^4$ .............................................. G02B 6/38
[52] U.S. Cl. ........................... 350/96.21; 350/96.18; 350/96.20
[58] Field of Search ............... 350/96.18, 96.19, 96.20, 350/96.21, 96.22

[56] References Cited

U.S. PATENT DOCUMENTS

| | | | |
|---|---|---|---|
| 4,130,344 | 12/1978 | Lemonde | 350/96.21 |
| 4,142,777 | 3/1979 | Ganthier et al. | 350/96.21 |
| 4,265,511 | 5/1981 | Nicia et al. | 350/96.2 X |
| 4,290,667 | 9/1981 | Chown | 350/96.21 X |
| 4,329,017 | 5/1982 | Kapany et al. | 350/96.2 X |
| 4,362,360 | 12/1982 | Mannschke | 350/96.20 |
| 4,385,798 | 5/1983 | Yevick | 350/96.2 X |
| 4,447,119 | 5/1984 | Beasley | 350/96.18 |
| 4,486,071 | 12/1984 | Levinson | 350/96.2 X |
| 4,542,956 | 9/1985 | McCrickerd | 350/96.20 |
| 4,564,260 | 1/1986 | Dirmeyer et al. | 350/96.16 |
| 4,579,418 | 4/1986 | Parchet et al. | 350/96.2 |
| 4,641,915 | 2/1987 | Asakawa et al. | 350/96.18 |

FOREIGN PATENT DOCUMENTS 1155282 10/1983 Canada .

OTHER PUBLICATIONS

Soref et al., "Tilting-Mirror Fiber-Optic Accelerometer", Feb. 1984, *Applied Optics*, vol. 23, No. 3, pp. 486–491.
"Multiposition Optical-Fibre Switch", Electronic Letters, vol. 15, Feb. 13, 1979, p. 192.
Newport Corporation, "Precision Fiber Couplers", *NewportProduct Supplement*, pp. 65–66, 1985.
Palais, Joseph C., "Fiber Coupling Using Graded-Index Rod Lenses", *Applied Optics* vol. 19, No. 12, pp. 2011–2018, Jun. 15, 1980.
Tomlinson, W. J., "Applications of GRIN-Rod Lenses in Optical Fiber Communication Systems", *Applied Optics*, vol. 19, No. 7, pp. 1127–1138, Apr. 1980.

*Primary Examiner*—John Lee
*Assistant Examiner*—John Ngo
*Attorney, Agent, or Firm*—Jones, Tullar & Cooper

[57] ABSTRACT

An adjustable connector for optically connecting a pair of optical fibres in end-to-end relation, whereby insertion and tilt losses at the connector are minimized, is disclosed. The basic connector includes a pair of base plates, each of which can receive therein an optical fibre, the fibre terminating at a beam expanding lens held within the base plate. Confronting faces of the base plates abut a separating resilient washer member and a plurality of screws axially pass from one base plate to the other about and adjacent the outer edge thereof. With the fibres locked in place a test signal is passed through the connector along the fibres and the screws are individually rotated to angularly adjust the base plates relative to each other until the received test signal is optimized. The screws remain in the adjusted position and the connector may then be placed on service. Either fibre can be disconnected from and reconnected to its base plate without disturbing the adjustment. Also the lens may be part of the fibre termination or it can be secured in a separate holder if the fibre already has a commercial terminal connector thereon. In the latter case the terminal connector is held in an appropriate adapter which is in turn held in its base plate adjacent its lens.

69 Claims, 22 Drawing Sheets

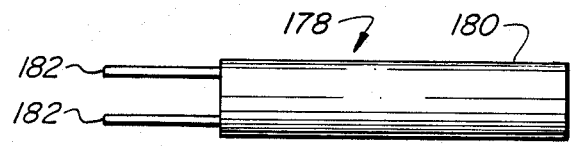
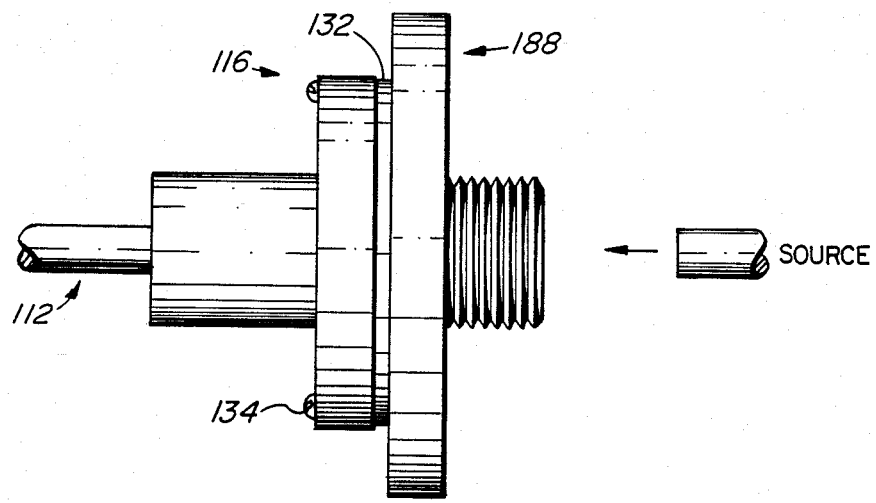
FIG. 7
FIG. 8
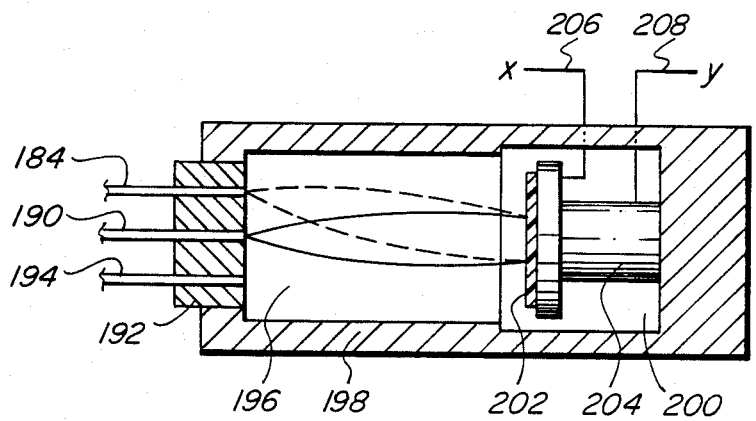
FIG. 9

TILT ADJUSTABLE OPTICAL FIBRE CONNECTORS

The present invention relates to connectors used to effect connections between separate lengths of optical fibres, and more particularly to connectors which are adjustable to optimize the transmission of light energy through the joint and which do not lose their adjustment when one or the other fibre is disconnected from and reconnected to the connector.

BACKGROUND OF THE INVENTION

The use of optical fibres for the transmission of data or optical information has increased dramatically in recent years. The heart of such transmission systems is an optical fibre of silica glass or other suitable material which has been clad with an appropriate material to achieve a "light tube" or waveguide along which light energy can travel in a controlled manner. Optical fibres are extremely small (maybe 100 microns in diameter) and when they are incorporated into a data transmission system it is necessary to effect interconnections between separate lengths of such fibres. The primary function of an optical connector is to provide a low-loss coupling of light energy from one fibre to the next and it is necessary to align, in an extremely precise manner, the cores of the coupled fibres so as to keep the losses at the joint to an absolute minimum.

The best coupling possible between two fibres is achieved by polishing the ends of the fibres to a smooth finish and then directly butting the ends together. Disregarding any fresnel losses at the glass-air interface such a connection should have losses in the order of 0.2 dB. This type of connection requires high precision equipment and is best suited for permanent splices. For repeated connections a more rugged connector is required, but such can lead to increased losses.

There are six main sources of losses in any fibre to fibre coupling system. The greatest losses are due to lateral misalignment, when the mating fibres are not aligned along their central axes. Also, although manufacturers place tight tolerances on the position of the core within the cladding, any eccentricity of the central core is treated as a lateral misalignment condition. Angular losses occur when the central axes of the two fibres are tilted with respect to each other. End separation losses occur when the ends of the mating fibre are separated. Greater separations result in greater losses since light emanating from the end of an optical fibre is projected in the form of a cone. Dirt, surface irregularities and non-perpendicular ends conspire to keep the ends apart and generate losses. Extrinsic connector (intrinsic fibre) losses are caused by variations in the optical parameters of the fibre, including its "numerical aperture" (NA), concentricity of the core, core ellipticity and diameter variations. Finally, fresnel losses occur whenever light passes from one transparent medium into another medium of a different index of refraction, since part of the transmitted light will be lost to a reflected beam. For transmission from glass to air the fresnel losses can be 0.2 dB for each surface. This loss can be eliminated by using index-matching fluids, or reduced by using anti-reflection coatings.

In order to minimize losses such as described above the tolerences of butt-joint connections must be extremely tight. However, any small piece of dirt which enters the joint can drastically increase the losses of the connection and accordingly the ends of the fibre must always be protected from ambient conditions.

The problems associated with connections as described above can be reduced by the use of "expanded beam" technology through which the optical beam diameter is increased from the core diameter of 100 microns up to a more manageable size of a few millimeters. Since the resulting beam is considerably larger than a speck of dirt the losses associated therewith are reduced. Furthermore since one is dealing, relatively speaking with a macro rather than a micro situation all aspects of the connection become simpler, from manufacture, to maintenance.

If a fibre is placed at the focal point of a lens then the beam emerging from the lens is collimated with diameter much larger than that of the fibre core and if each fibre has an appropriate lens the spot image from one will be formed on the other at the focal point of its lens. Expanded beam connectors obviously reduce losses due to lateral misalignment and end separation. However, due to the auto-collimation such connectors increase the losses due to angular misalignment In principle, if the fibres are positioned at the focal point of the lenses with the same accuracy as with end-to-end butt joint connections the losses should be the same with an expanded beam coupler. Several couplers using expanded beam technology are presently available commercially. One of the easiest lens to use in fibre connectors is the graded index (GRIN) lens.

Cylindrical GRIN lenses are functionally identical to conventional spherical lenses except that they have flat end surfaces. The change in the index of refraction along its axis generates the unique properties of the GRIN lens and lenses can be tailored by the manufacturer to generate a wide range of optical parameters. The length of a lens defines its pitch, or the fraction of a complete wavelength, that is contained within the lens at a particular wavelength. For the production of a collimated beam from a point source it is necessary to use a quarter-pitch lens.

If one quarter-pitch GRIN lens in a joint is tilted by an angle $\theta$ relative to the other lens then the transmitted image will be displaced relative to the receiving lens axis by an amount given by the equation $z = \tan \theta / N_o A$ where $\theta$ is the tilt angle; No and A are GRIN lens parameters which determine the focal length of the lens, since $f = 1/N_o A$. For different types of specific GRIN lenses the losses due to a tilt angle of 1 degree can range from about 6 dB to well over 10 dB. Furthermore, as the fibre core size decreases the tilt losses will become more severe. In a GRIN lens connector if there is any tilt variation in the lenses or even in the placement of the fibres then the transmitted image will not be focussed on the receiving fibre. It therefore is very desirable to achieve a connector in which the tilt losses are minimized without demanding extremely high (costly) manufacturing tolerances.

The principles stated above apply to other imaging lenses, not just to GRIN lenses. If the image is formed at the focal point of the lens then a tilt through the angle $\theta$ will produce a translation of $z = \tan \theta / N_{oA} \approx f \tan f \theta$ at the fibre end face. For small angles $\theta \approx \tan \theta$.

SUMMARY OF THE INVENTION

The present invention is intended to overcome specifically the tilt problems associated with beam expanding or imaging lens type connectors or couplers and the extremely high tolerance requirements of placing the fibre end at the focal point of the lens. The present invention is embodied in a new connector or coupling device which is economical to manufacture, may be easily hermetically sealed in use, is effortlessly manipulated during disconnection and reconnection, and is adjustable to optimize the transmission of light energy therethrough. The coupling device of the present invention uses the properties of lenses in combination with novel tilting techniques to achieve a compact structure capable of submicron resolution. Furthermore, with very little, or even no, adjustment devices embodying the principles of the present invention could be used as source couplers, attenuators or connectors to couple light into any size or number of receiving fibre(s)

Throughout the disclosure and claims it should be understood that the word "optimum" and its variants is intended to have a broad meaning, such as "most favourable under defined conditions". The "optimum" signal strength for a coupler might be the maximum obtainable, whereas for an attenuator it would be a desired signal strength, less than maximum.

In one form the present invention utilizes a pair of base plates each having a threaded boss thereon and an axial bore therethrough. Each bore is adapted to receive in a predetermined position therein a holder which carries a beam expanding or imaging and an optical fibre associated therewith. The lens holder has a nut thereon for threaded connection to the boss of the base plate such that the holder can be disconnected from the base plate and reconnected thereto. A resilient member is sandwiched between confronting faces of the base plate and threaded screws interconnect the base plates by passing from one plate through the resilient member to the other plate. The central void area of the resilient member contains the opposing faces of the lenses and may be hermetically sealed from the surrounding atmosphere by sealing contact with the base plates. Once the connector has been assembled a test light can be transmitted from one fibre through the connection to the other fibre and then to a suitable receiver. The threaded screws can then be adjusted to alter the angular orientation of one base plate relative to the other so as to alter the angular orientation of one lens and its fibre relative to the other. During adjustment the receiver is monitored and the screws are adjusted in a pattern until the detected output is optimized at which point the adjusting procedure is stopped. Even if one or both of the fibres is disconnected from the joint as described above the base plates will hold their adjusted condition and the fibres can be reconnected to the joint without fear of any increase in losses after reconnection.

Broadly speaking, therefore the present invention may be considered as providing a coupling device for optically coupling a pair of optical fibres in end-to-end relation, each of the fibres terminating at a beam expanding or imaging lens, comprising: base means for each of the fibres, each such base means including an axial bore and means for securing one of the lenses therein; a resilient member positionable between and against confronting end faces of the base means, the resilient member permitting passage of light energy thereacross; and axially extending securing and adjusting means interconnecting the base means with the resilient member trapped therebetween; whereby the securing and adjusting means are individually axially displaceable to effect an angular adjustment of one base means relative to the other so as to optimize the light energy transmissable from one fibre and its lens to the other lens and its fibre.

BRIEF DESCRIPTION OF THE DRAWINGS

FIG. 7 shows a tool usable to insert the components of the second embodiment.

FIG. 8 shows a bulkhead connector using the principles of the present invention.

FIGS. 9 and 10 show cross-sectional views of two one-end couplers (optical switches) using the principles of the present invention.

DESCRIPTION OF THE PREFERRED EMBODIMENT

Figure 1:
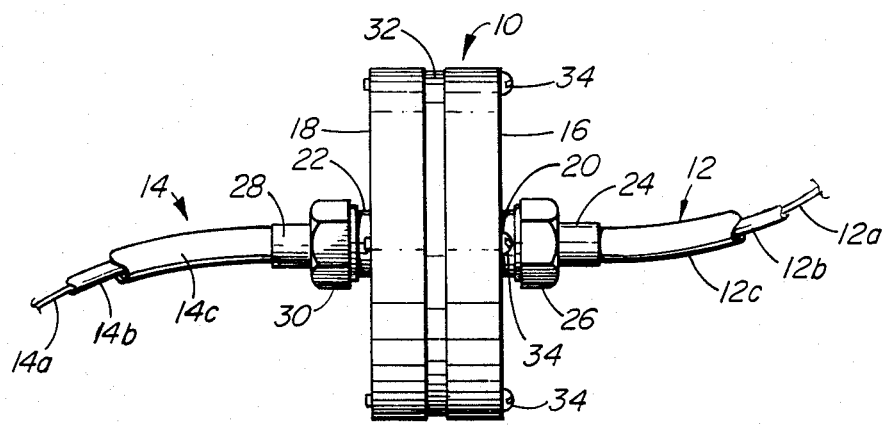
FIG. 1 is a side view of the optical fibre coupling device of the present invention.
Figure 3:
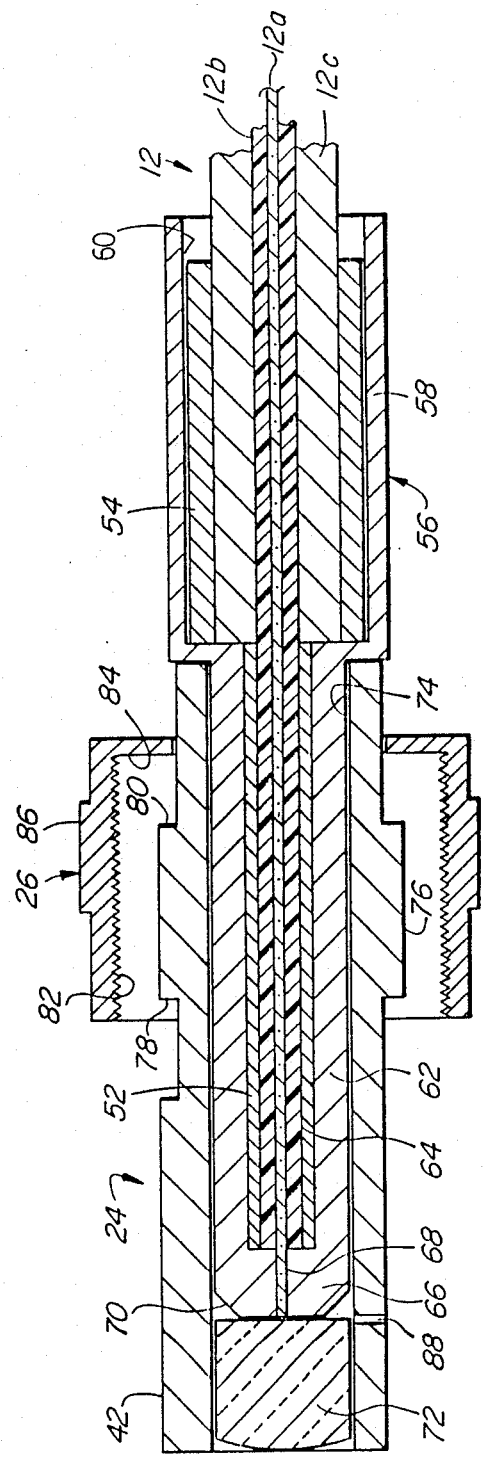
FIG. 3 is a cross-section of an optical fibre and lens holder receivable in a base plate of the present invention.

The basic optical fibre coupling device according to the present invention is illustrated in FIG. 1 under reference number 10. The coupling device 10 is used to join a pair of optical fibre assemblies 12,14 in end-to-end relation so that an optical signal in the form of light energy can be transmitted from one assembly to the other with minimum losses at the joint. The optical fibre assemblies 12,14 typically include the clad optical fibre core 12a,14a a plastic coating 12b,14b surrounding the core and a protective cable or sheath 12c,14c surrounding the coating. With reference to FIG. 3 it is seen that each clad fibre core 12a,14a terminates at a graded index lens (GRIN) 72, which with the fibre core end being positioned at the focal point of the lens, expands and collimates the optical signal for improved transmission to the receiving GRIN lens. Suitable GRIN lenses for the present invention are available under the SEL-FOC (Trademark) designation from the Nippon Sheet Glass Company.

Figure 2:
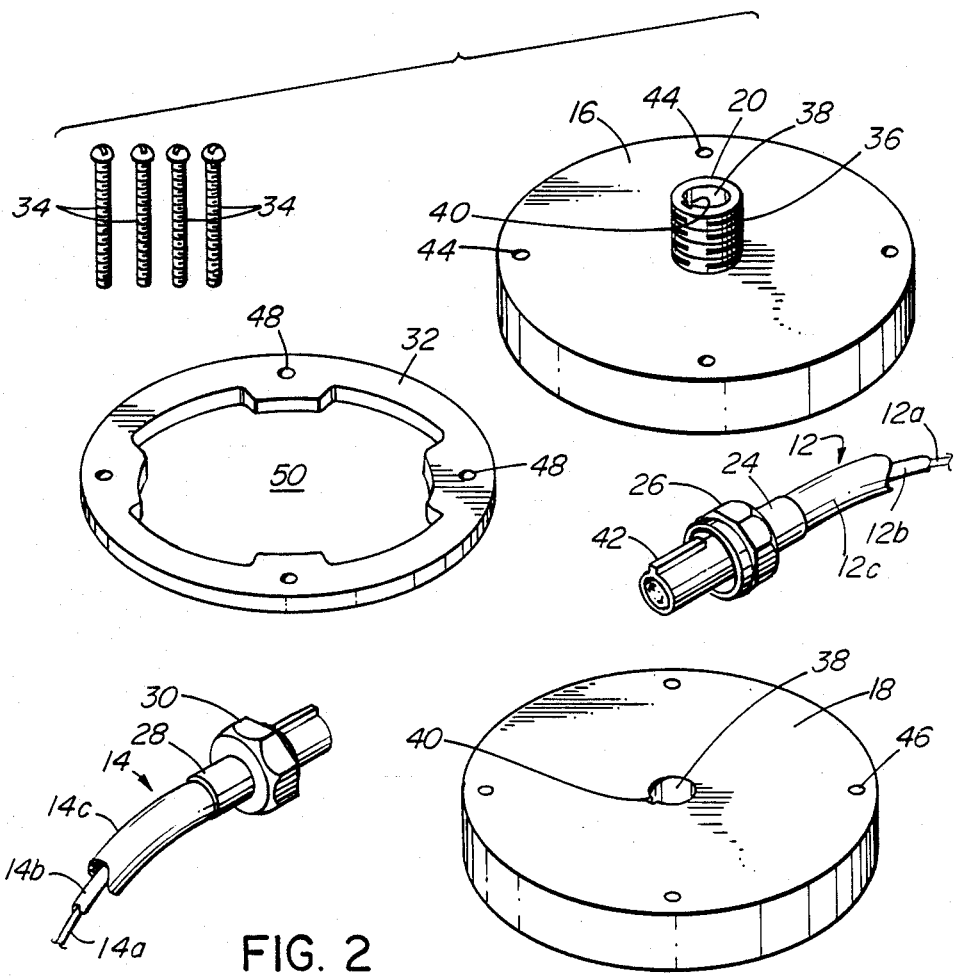
FIG. 2 is a composite view of the major components of the coupling device of the present invention.

With reference to FIGS. 1 and 2 it will be seen that each optical fibre assembly 12,14 is received in a corresponding base plate 16,18 via an appropriate connection mechanism to be described herein. Each base plate, 16,18 is provided with a central boss 20,22 projecting outwardly from one face thereof. Each boss carries external threads 36 and a central bore 38 extends axially through the boss and its base plate to exit at the flat obverse face thereof. A keyway 40 is machined in the sidewall of the bore 38 for a purpose to be described.

Each fibre assembly 12,14 carries at its end a lens holder 24,28 and each lens holder in turn carries a nut 26,30 which is free to rotate thereon. Furthermore each lens holder carries a key 42, which is matable with the keyway 40 provided in the axial bore 38 of each base plate. When it is desired to assemble a fibre assembly 12,14 to its base plate 16,18 it is only necessary to slide the lens holder 24,28 into the appropriate axial bore 38 with the key 42 engaging the keyway 40 and to then rotate the nut 26,30 to engage the internal threads thereof with the external threads 36 on the boss 20,22. When the mating threads are fully engaged the lens holder will be held in a predetermined position within its base plate.

Returning to FIG. 2 it will be seen that one base plate 16 is provided with circumferentially spaced through holes 44 positioned adjacent the periphery of the base plate. The other base plate 18 is provided with circumferentially spaced threaded bores 46 positioned adjacent the periphery of that base plate, the bores 46 being alignable with the holes 44. Threaded screws 34 are provided for threaded engagement with the threaded bores 46 and for a close fit within the holes 44. The screws 34 should have at least 56 threads per inch, preferably at least 80 threads per inch. A greater number of threads per inch provides higher resolution in the adjustment step. Finally, a resilient washer member 32 is provided, the washer member having through holes 48 alignable with the bores 46 and the holes 44 and also having a central void area 50, the configuration of which is not critical to the invention.

The components of FIG. 2 are assembled together as shown in FIG. 1, with the fibre assemblies 12,14 connected to the base plates 16,18 and with the base plates 16,18 connected together with the obverse faces thereof in confronting relation and with the resilient washer member 32 sandwiched between the obverse base plate faces. The screws 34 pass through aligned holes 44 and 48 and are threadedly received in threaded bores 46 such that when the screws are tightened they sealingly clamp the washer member 32 between the base plates 16,18. When initially assembling the base plates and the washer member together it is advantageous to slide the base plates on to a centering rod which fits closely within the bores 38, to ensure that the axes of the base plates are initially aligned when the screws 34 are set at their initial positions.

The washer member 32 is shown in FIG. 2 as being continuous peripherally and as having flat surfaces which abut the confronting faces of the base plates. Such a member is particularly useful if it is desirable to hermetically seal the interior of the coupler, as in an underwater application. In such an application an O-ring (not shown) could be placed between the end face of the boss 20,22 and the inner face of the nut 26. If hermetic sealing is not required the washer member 32 could be formed as an annular spring member, such as a Belleville washer, having appropriate holes through which the screws 34 could pass. Instead of an annular spring, individual springs located at each screw 34 could bias the base plates apart. Alternatively the annular spring member (or the washer member 32) could be located within the circumference defined by the screws so that it would then not be necessary to have the screws pass through the washer or spring member itself. Usually the washer member 32 would be formed from a rubber or soft plastic material, although it would be possible to use a soft metal (e.g. indium) if desired.

As an alternative to the washer member 32 described above it would be possible to hermetically seal the interior of the connector with a commercially available O-ring. One base plate could be provided with an annular groove in its confronting face, in which the O-ring is receivable, a portion of the O-ring projecting away from the face of the base plate. The other base plate need not have a mating groove as its face will be forced into sealing engagement as the screws 34 are drawn tight. In this embodiment the O-ring preferably lies within the circumference of the screws 34.

With reference now FIG. 3, the internal structure of a typical fibre assembly 12 will be described, it being understood that FIG. 3 is drawn to a much larger scale than the components themselves.

The fibre assembly 12 is made up of several components, namely the clad core 12a which is typically a silica or a doped silica glass of extremely small diameter (e.g. 100 microns), the plastic coating 12b which surrounds the clad core, and the cable or sheath 12c which may be formed from a resilient flexible plastics material and serves to protect the clad core and the plastic coating. The outer diameter of the sheath will be in the order of 4 mm.

At the end of the fibre assembly the sheath is removed or stripped from the plastic coating over a short length of about 13 mm and an optional, yet desirable, inner crimp sleeve 52 is fitted over and crimped to the exposed coating 12b. An optional, yet desirable, outer crimp sleeve 54 is fitted over and crimped to the sheath 12c adjacent the inner end of the inner crimp sleeve 52. At the free end of the assembly a very short length of the clad core 12a is exposed.

The assembly 12 having the sleeves 52 and 54 crimped thereon is slid into a fibre ferrule 56. Ferrule 56 includes three distinct sections, namely an enlarged first section 58 having an axial bore 60 therein adapted to loosely receive the outer crimp sleeve 54, a reduced diamater second section 62 having a reduced diameter blind axial bore 64 therein adapted to receive the inner crimp sleeve 52, and an end section 66 having a small axial bore 68 therein adapted to securely receive the short length of clad core 12a from the fibre assembly 12. The end section 66 has a bevelled edge 70. The ferrule 56 can be metallic, plastic or ceramic, depending on the application of the connector, lf for example, the connector is to be used in a high temperature environment a ceramic ferrule would be desirable since it has a coefficient of thermal expansion very close to that of the glass used for the optical fibre. Also, if crimp sleeves are not used the fibre ferrule could be smaller than it would be if crimp sleeves are used.

After the portions of sheath and coating have been stripped from the fibre assembly 12, the inner and outer crimp sleeves 52,54 are secured to the coating 12b and the sheath 12c in the locations as described above. The sleeves may be metallic or plastic as long as they serve to reinforce the fibre assembly at its end. After fitting the sleeves to the fibre assembly the fibre ferrule is slid onto the end of the fibre assembly so that the clad core section fits in the bore 68 and sleeves 52,54 fit in the stepped bores 64,60 respectively. The ferrule may be secured to the fibre assembly 12 in any known manner, as by crimping or by potting with an epoxy resin. The fit between each sleeve 52,54 and its bore 64,60 is slightly loose to permit the potting material to extend therealong.

After the fibre ferrule 56 is securely attached to the fibre assembly a graded index lens 72 of enlarged diameter, such as a SELFOC lens, is soldered or glued within the end of the lens holder 24. If hermeticity is important the lens could be metallized so that it can be soldered to the lens holder and thus sealed thereto.

The ferrule/fibre assembly 56/12 is next assembled into the lens holder 24. The lens holder 24 is generally cylindrical and is of a length equal to that of the lens 72 and the second and end portions of the ferrule 56. The lens holder 24 has an axially extending bore 74 adapted to securely receive the lens 72 and the second and end portions of the ferrule. The lens holder 24 also has an enlarged diameter portion 76 adjacent its inboard end defining annular shoulders 78 and 80. Furthermore, the barrel of the lens holder has the longitudinally extending key 42 formed thereon, the actual shape of the key 42 being immaterial as long as it mates with the keyway 40.

Before the ferrule 56 is assembled to the lens holder 24, the nut 26 is slid onto the inboard end of the lens holder. The nut 226 includes internal threads 82, an end face 84 and flats 86 for engagement by a suitable wrench if necessary. With the nut in place the ferrule assembly is slid into the bore 74 until the end face of the ferrule, containing the end face of the clad core abuts the end face of the lens 72. The lens holder is then secured to the ferrule in any conventional manner as by gluing or potting. An air hole 88 is provided in the wall of the lens holder at the interface between the lens 72 and the fibre ferrule 56. It permits the escape of air and/or excess glue or potting compound when the ferrule is assembled to the lens holder. Also, since the first section of the ferrule has a slightly greater diameter than that of the adjacent portion of the lens holder the nut 26 will be free to rotate on the lens holder but will be captured between the shoulder 80 on the lens holder and the first section of the ferrule.

When the two fibre assemblies 12,14 have been constructed as described above, they may then be assembled to the base plates 16,18 as previously described. The key 42 will engage the keyway 40 and, upon full insertion into the axial bore 38, the shoulder 78 on the lens holder 24 will abut against the outer face of the boss 20,22 on the base plates 16,18. Thus, by the mechanism of abutting faces and mating keys/keyways the fibre assemblies will always assume the same predetermined position in their respective base plates each time they are connected thereto.

When the connector of the present invention is first assembled there will be no guarantee that (a) the axis of the fibre core 12a,14a is perfectly aligned with that of its GRIN lens 72, or (b) that the axes of opposing GRIN lensses 72,72 in the joint are perfectly aligned. Expressed in a different way, there is no guarantee that the image transmitted from one fibre will not be offset excessively with respect to the receiving fibre. Any misalignment will result in losses at the joint. The present invention obviates that shortcoming by permitting adjustment of the relative angle between the two GRIN lenses and their fibres to achieve the desired optical energy transmission. Once adjustment has been accomplished the adjusted condition will be maintained even though the fibre assemblies are disconnected from and reconnected to the joint connector 10, due to the precision positioning of the assemblies as detailed above. Should the original adjustment be lost or the optical energy transmitted deteriorate for any reason the joint can be readjusted to again optimize the energy transmission.

The initial adjustment of the joint requires a completely assembled joint, a test source of light and a meter-like receiver. The process is very simple and short in duration: an optical signal from the test source is beamed along one of the fibre assemblies, through the joint, to the other fibre assembly, and is received at the receiver. The receiver will provide a relative indication of the signal strength. The screws 34 are then rotated so as to move, or "tilt" one of the base plates relative to the other while the received signal is monitored. The screws have very fine threads and their movements can be accurately controlled. The operator will quickly ascertain which screws require adjustment and he will then quickly adjust the appropriate screws to obtain a desired strength of optical signal passing through the joint. Once the desired signal strength has been obtained, thereby indicating that the image of the transmitting fibre is falling on the receiving fibre as desired, the adjustment procedure is terminated. The combination of a very fine pitch on the screws and the resilient bias provided by the member 32 is sufficient to hold the screws in their adjusted condition so as to prevent any unwanted rotation thereof. Should readjustment of the joint be required later it would be merely necessary to repeat the adjustment procedure outlined above.

If further adjustment is not contemplated or if the coupler is to be used in a hostile environment the screws 34 could be secured relative to the base plates as by gluing, thereby rendering them immobile. Alternatively it would be possible to glue, pot or solder the joint between the base plates after the adjustment step to render the joint immobile, albeit not readjustable The coupler of this invention provides a very low loss connector for optical fibres. This how loss, less than 0.8 dB, is the result of the precise alignment of the image of the transmitter fibre on the receiver fibre by control of the tilt angle between the receiver and transmitter lenses. In the case of 2-56 screws used on a radius of 1.35 cm, one rotation of a screw results in a displacement of 435 microns. In practice, one can control the rotation of the screw by ±2 degrees, resulting in a resolution of about ±2.5 microns. With a lever arm of 2.7 cm this translates into an actual resolution or displacement of the optical image by ±0.28 microns. Of course, the actual angular resolution depends on the type of GRIN lenses used and the configuration of the connector.

For small tilt angles $\theta$ the resolution of the coupler is determined by $z = f\theta = f\Delta x/1$ where f is the focal length of the lens, $\Delta x$ is the resolution of the screws and 1 is the lever arm.

ALTERNATIVE EMBODIMENT

In the embodiment of FIGS. 1-3 the optical fibre and its GRIN lens were held in a lens holder and the other components were attached as indicated. In practice, the first embodiment can only be used with the appropriate components as described. However, many manufacturers supply other connectors and these can be adapted to the coupler of the present invention by using a suitable adapter ferrule. Two such connectors are the popular SMA type and the AMP* type. It is possible to insert the connector end of either type into its own adapter so that the end of the connector becomes flush with the end of the adapter. The connector is then inserted into the base plate and secured in position with the end of the connector in close proximity to its GRIN lens. Index matching fluid may be used to minimize optical (fresnel) losses and to provide a smooth interface between connector and GRIN lens, as by reducing the friction at the lens/connector interface.

Figure 4:
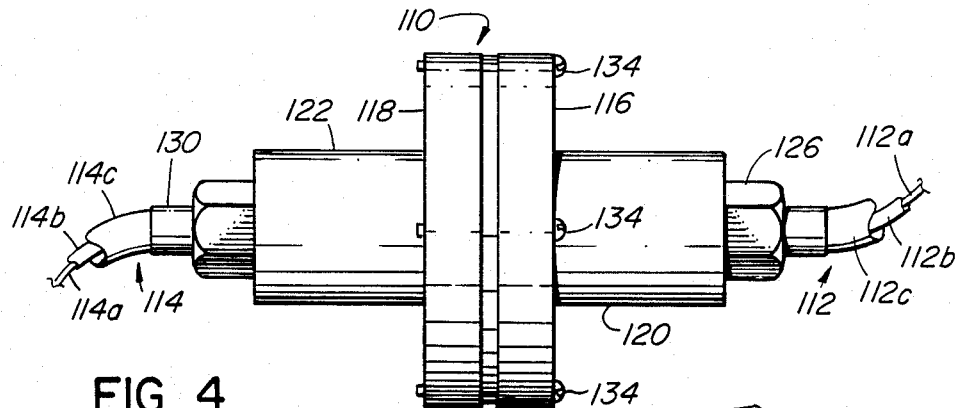
FIG. 4 is a side view of a second embodiment coupling device in accordance with the present invention.
Figure 5:
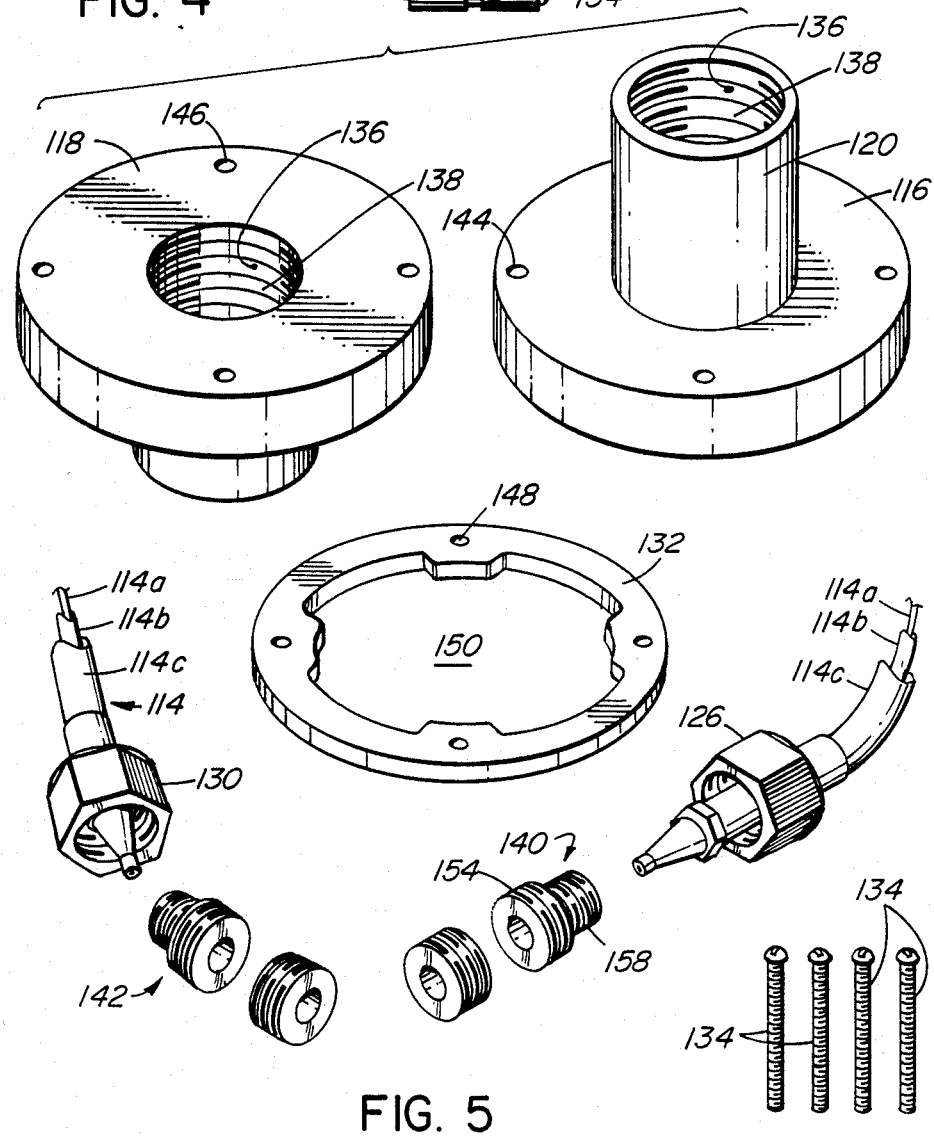
FIG. 5 is a composite view of the major components of the second embodiment of the present invention.

FIGS. 4 to 6 illustrate a "universal" coupler which is adapted to accommodate fibre assemblies which terminate with SMA and AMP-type connectors. Where appropriate the reference numbers of FIGS. 4 to 6 use the same basic numbers as FIGS. 1 to 3, increased however by 100. Thus, in the alternative embodiment of FIGS. 4 to 6 the coupler of the invention carries the reference designation 110.

The coupler 110 is used to connect together fibre assemblies 112,114 and uses the same basic principles as the previously described connector. The coupler 110 uses matching circular base plates 116,118 having bosses 120,122 rising from one face thereof. In this embodiment the axial through bore 138 of each base plate is of a larger diameter than in the first embodiment and the bosses are internally threaded, as at 136, rather than externally threaded. As with the first embodiment a resilient washer member 132 having a void area 150 is placed between confronting faces of the base plates 116,118 and fine-pitch threaded screws 134 connect the base plates together, passing through the bores 144 in one base plate and the passages 148 in the washer member to be received in the threaded bores 146 in the other base plate. When assembled together the interior of the coupler 110 will be hermetically sealed from the surrounding atmosphere. It is understood that alternative resilient members as described in relation to the first embodiment could be used with this embodiment as well.

Figure 6A:
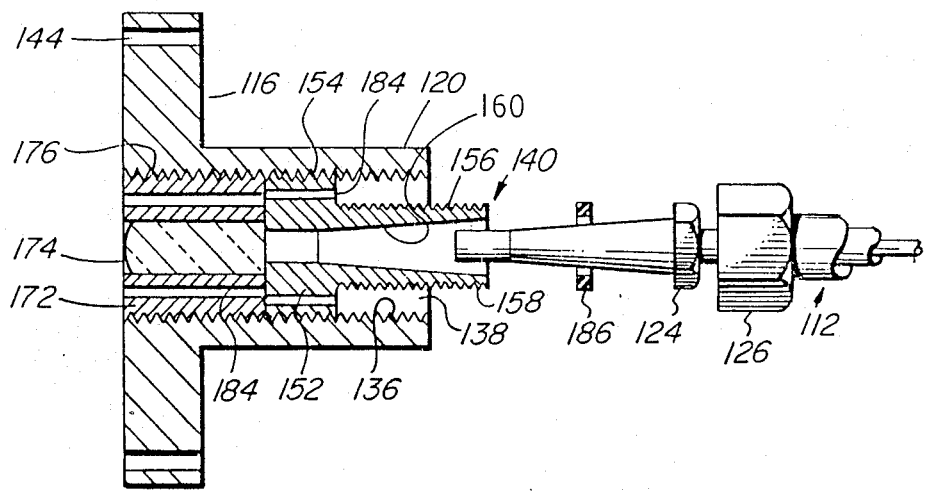
FIGS. 6A and 6B show simplified cross-sectional views of the connections possible with the second embodiment.
Figure 6B:
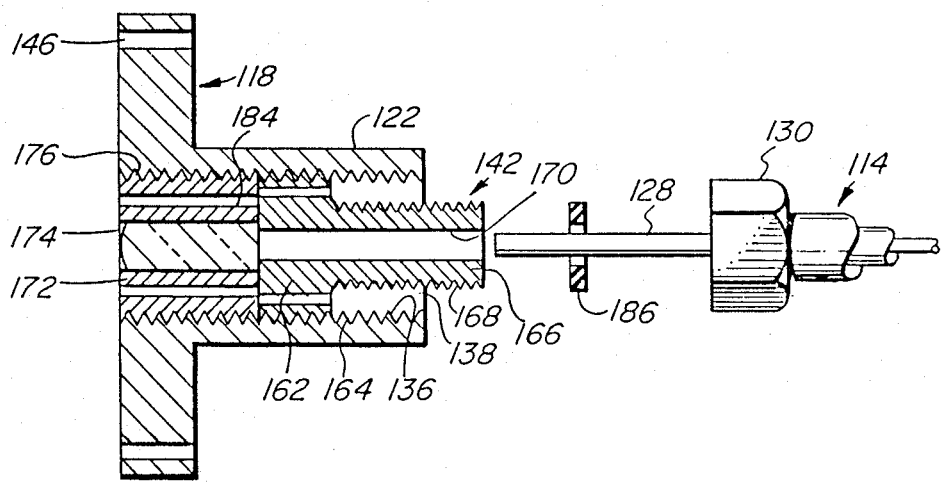

FIGS. 5, 6A and 6B show various of the components used in this embodiment. Specifically, the figures show the fibre assembly 112 terminated by an AMP-type connector 124 with a captured rotatable nut 126 thereon, and the fibre assembly 114 terminated by an SMA-type connector 128 with a captured rotatable nut 130 thereon. Since the AMP and SMA-type connectors are well-known it is not necessary to discuss the construction thereof in detail, except to say that they have the general appearance as illustrated.

To effect the necessary connection of the fibre assemblies 112,114 to the coupler 110 it is necessary to provide appropriate adapters and these are illustrated as items 140 and 142. Adapter 140 (FIG. 6A) has a major diameter portion 152 having an external thread 154 matable with the internal thread 136 of the boss 120 and a minor diameter portion or boss 156 extending from the external face thereof, the portion 156 having an external thread engageable by the threaded nut 126. The adapter 140 has an internal bore 160 configured to receive the frustoconical end portion of the AMP-type connector 124.

The adapter 142 has a major diameter portion 162 externally threaded as at 164 for engagement with the internal threads 136 of the boss 122, and a minor diameter portion or boss 166 externally threaded as at 168 for engagement with the nut 130. An axially extending bore 170 is configured to receive the cylindrical end of the SMA-type connector 128.

Neither of the connectors 124,128 is provided with a GRIN lens and accordingly it is necessary to provide, for each base plate, a lens holder 172 having an axial bore 174 sized to receive an appropriate GRIN lens (not shown). The lens holders 172 are externally threaded as at 176 for threaded engagement with the internal thread 136 of the bosses 120,122. The GRIN lenses used in the lens holders 172 will be similar to those used in the first embodiment.

When assembling the coupler 110 one can first of all assemble the two base plates 116,118 together with the resilient washer 132 captured between the confronting faces of the base plates by using the screws 134, as shown in FIG. 4, and as described for the first embodiment. Preferably a centering rod will be used to initially align the base plates during assembly thereof. Then, one of the lens holders 172 (with a GRIN lens secured in bore 174) is threaded into one of the bores 138 by using a tool 78 as shown in FIG. 7. The tool 178 includes a handle portion 180 with a pair of pins 182 projecting from one end thereof. The pins 182 cooperate with through bores 184 provided in the lens holders 172 and the adapters 140,142 so that rotation of the tool 178 will rotate the lens holder or adapter into or out of the appropriate bore 138. Bores 184 act as air or resin exhaust holes and permit air or resin to escape from the interior of the coupler during assembly.

With the lens holders in place the adapters 140,142 are threaded into the respective bores 138 using the tool 178 so that the adapter abuts the previously positioned lens holder 172. An O-ring or sealing washer 186 may be placed against the end face of the reduced diameter portion of the adapters 140,146 to absorb the force exerted by the connector ferrule on the lens and then the connector 124,128 is slid into its appropriate adapter. The nuts 126,130 are tightened on the threads of the adapter to complete and seal the connection.

The completed joint is then ready to be tested and adjusted as with the first embodiment. A test signal is passed through the joint and the screws 134 are adjusted to tilt one base plate relative to the other until the optimum signal strength, as monitored, is achieved. The stabilized joint is then ready for use.

While the joint 110 has been described with regard to one AMP-type and one SMA-type terminal connection it is clear that any combination of commercial terminal connectors could be used in this universal joint as long as appropriately configured adapters, for positioning in the same locations as adapters 140,142, are available.

By utilizing the present invention and the principle of adjusting the tilt angle between two GRIN lenses it is possible to overcome, or at least reduce substantially, the losses caused by axial and angular misalignments between fibres and lenses and the angular misalignment between two lenses. The same technique of a four-point suspension allows the tilt angle to be easily adjusted and then rigidly controlled. At the cost of having to initially monitor the transmission coefficient one can produce a low loss, low cost, highly repeatable coupler (first embodiment) or a low loss, universal coupler (second embodiment). The second embodiment permits the use, through appropriate adapters, of already terminated standard connectors. Different beam expanding or imaging lenses could be used to improve the resolution of the displacement and to minimize the size of the coupler at the expense of slightly greater lateral misalignment losses due to the tolerances of the mechanical dimensions, typical fibre sizes being in the range of 10 to 400 microns in diameter.

In practice the present invention can also be used to improve the coupling in devices which use any form of imaging or expanded beam technology.

Several additional constructions utilizing the principles of the invention, and several alternatives within the principles of the invention are described hereinbelow.

1. Bulkhead Connector (FIG. 8)

One half (116,132) of the joint of the present invention may be attached via the appropriate screws 134 to an adapter 188 which can be threaded into a bulkhead so as to efficiently couple light from a large aperture source to an optical fibre. In this case the GRIN lens within the base plate 116 images the light onto the aperture of the fibre in fibre assembly 112 and the tilt adjust mechanism ensures that the image of the source is optimally placed on the receiving fibre. Improved coupling between LED (light emitting diode) sources and a fibre can be realized by using the principles of the present invention.

A variety of radiation sources, such as He-Ne lasers, injection laser diodes, LED's, may be used and, accordingly, a variety of GRIN lenses may be used in the connector or joint. For example, a universal-tvpe connector was coupled onto a He-Ne laser using a 0.25-SLS-3mm SELFOC* lens. The insertion losses were found to be 0.3 dB and 0.5 dB for 100/140 0.3 NA SI and 50/125 0.2 NA GI fibres, respectively. A 0.25-SLN-2.0 mm lens was used for a 10 $\mu$m, 0.11 NA single mode fibre and insertion losses were measured at 0.8 dB.

2. Single Mode Connector

The transmission of light via single mode fibres requires very close tolerances for the core alignment and beam alignment. In many cases the single mode fibre core is only 10 microns in diameter. With the present invention it is possible to place or locate the focussing area with an accuracy of ±0.1 microns. This area and its tolerance is well within the 10 micron core diameter of the 1300 nanometer single mode fibre. Clearly the principles of the present invention provide an excellent way of connecting single mode fibres, although due to the extra (lens aberration) losses it is expected that the insertion losses may rise to 1.6 dB. The average loss with the single mode connector using a SLW-1.8 SELFOC* lens was found to be 1 dB.

3. Optical Switches (FIGS. 9, 10)

It is clear from the calculations on the accuracy and replacement of the optical fibre image that a series of optical fibres could be placed at the exit aperture of a joint of the present invention. By controlling the tilt angle using precision transmission techniques, such as by using piezoelectric materials, one could tilt the outlet aperture so

*Trademark that it could be switched from one output fibre to another. This is illustrated in FIG. 9 wherein an input fibre 190 is held in a ferrule 192 along with a pair (as illustrated) of output fibres 194 adjacent a GRIN lens 196 all held in a case 198. The case 198 has a cavity 200 in which a plane mirror 202 is mounted on a piezo-electric x/y bender 204. Control voltages for x and y movement are fed to the bender 204 as at 206 and 208 respectively and the unit is calibrated so that, upon selection of the appropriate output fibre, voltages of the required strength are fed to the bender 204 such that the optical signal from the input fibre 190 is reflected (dotted lines) to the selected output fibre 194.

Figure 10:
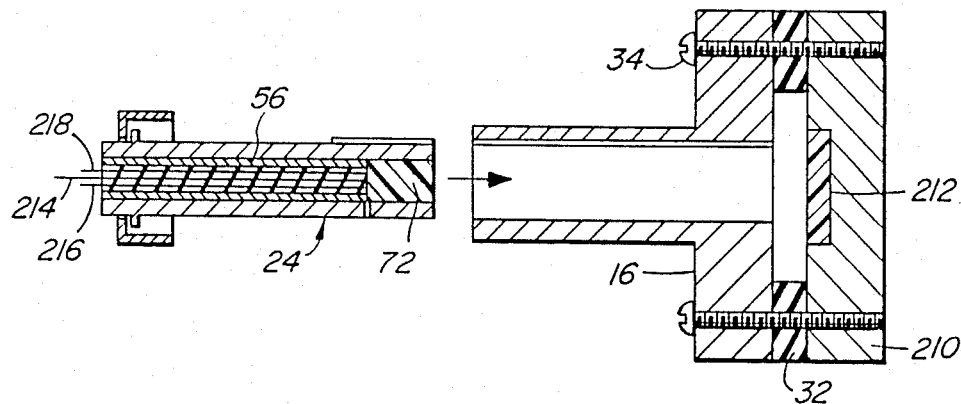

FIG. 10 illustrates another construction which could be utilized as an optical switch and which could also be considered as a one-end connector. In FIG. 10 a base plate 16, as described with reference to the first embodiment, carries a lens holder 24 within its bore 36. The lens holder carries a GRIN lens 72 and a fibre ferrule 56 as before. In this instance the screws 34 pass through the base plate 16 and a resilient washer member 32 and are received in a mirror support 210 which, in turn, mounts a plane mirror 212 in its inner surface. The fibre ferrule 56 carries a plurality of optical fibres, one of which is identified as 214 and is axially positioned in the holder, the others of which are identified as 216,218 and are symmetrically arrayed about fibre 214. Fibre 214 may be considered as the input fibre and the fibres 216,218 may be considered as the output fibres, it being understood that the construction is not limited to the illustrated configuration using three fibres.

By appropriately adjusting selected ones, or pairs, of the screws 34 it is possible to tilt the mirror 212 relative to the optical axis of the base plate 16 and the fibres 214,216,218 so that an optical signal transmitted by the input fibre 214 and imaged by the lens on the mirror 212 may be reflected by the mirror 212 to any selected one of the output fibres 216,218. Desirably, the selection procedure would be mechanised by having each screw 34 connected to be driven by servomotor (not shown) and the servomotors in turn suitably controlled, as by a microcomputer, so that the appropriate tilt adjustment of the mirror 212 could be effected via appropriate operation of the servomotors merely through identification of the selected output fibre.

4. Feedback and Alternative Monitoring (FIGS. 11A, 11B, 11C, 12)

When discussing the principles of the invention hereinabove, the fine adjustment of the coupler of the invention was achieved through a procedure wherein a test source of light energy was transmitted from one fibre, through the coupler to the other fibre and the output of the other fibre was monitored until the monitored signal was a maximum, at which point the connector was considered to be in adjustment. That technique is satisfactory for short fibre lengths but becomes rather awkward if the fibres are several kilometers long, as might be the case with telephonic data systems.

An alternative monitoring technique is described herein with reference to FIGS. 11 A to C and is based on the principle that if the plastic coating is stripped from the clad fibre core and is replaced by a material having a low attenuation coefficient and a higher index of refraction than the cladding then the cladding modes (light energy within the cladding) will be stripped therefrom and will be detectable within the surrounding material. If the stripped modes are minimized then the maximum energy can be considered to be passing along the fibre core. By using a suitable detector, connected to a suitable monitor, it is possible to monitor the stripped cladding modes of the coupler during adjustment so as to optimize the adjustment.

Figure 11A:
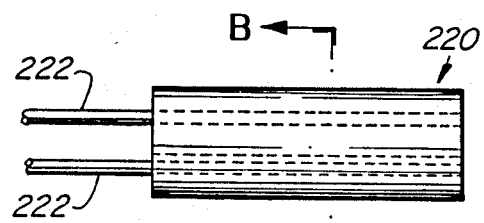
FIGS. 11A, 11B, 11C and 12 show monitoring connectors usable with the present invention.
Figure 11B:
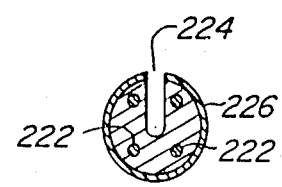

FIGS 11A and 11B show a detector 220 formed from a suitable plastics material and carrying therein four detector fibres 222. A central longitudinally extending groove 224 is provided in the detector 220 with the fibres 222 being symmetrically arranged thereabout. An outer sheath 226 is provided so that it can be rotated on the detector body to cover the groove 224. Fibres 222 will be connected to the monitor.

Figure 11C:
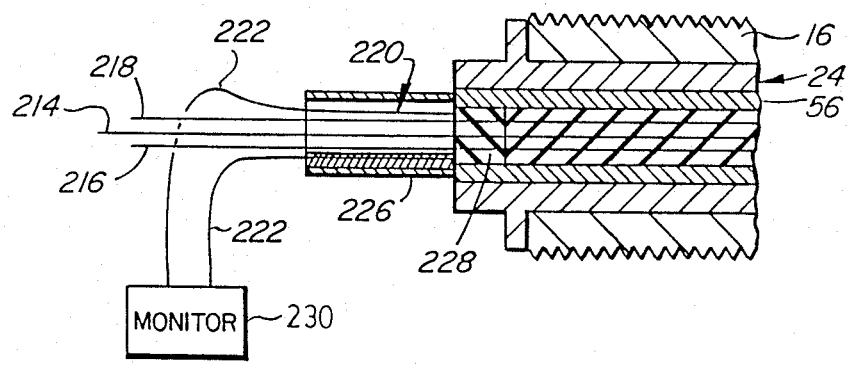

The detector 220 is shown in FIG. 11C as being connected to the one-end connector or optical switch of FIG. 10. In this case the plastic coating is stripped from the output fibres 216,218 at the end of the ferrule 56 and a translucent resin compound 228, having a higher index of refraction than that of the cladding, is potted around the stripped areas of the fibres 216,218. The detector is positioned so that all of the fibres 214,216,218 are located in the groove 224 and the polished ends of the detector fibres 222 abut the resin 228. The sheath 226 is rotated to cover the groove to prevent inadvertent decoupling of the detector. The fibres 222 are connected to a monitor 230 and the test signal is transmitted along the input fibre 214.

If the mirror 212 is tilted via screws 34 to reflect the signal to, say, the upper output fibre 218 in FIG. 11C the monitor 230 will register a certain amount of light being received by the fibres 222 due to light escaping from the fibre 218 into the material 228. More light will escape into the material 228 as the reflected light focussed by the lens 72 strays from the end of the selected fibre 218. When the screws 34 have been adjusted to the point where the light energy monitored is a minimum that then is an indication that a maximum of light energy is travelling along the fibre core and that the connector is in proper adjustment. The detector can then be removed or it can be glued in position as a permanent part of the structure.

The detector 220 of FIGS 11A and 11B shows four fibres 222 symmetrically located about the axis of the fibre ferrule. It would also be possible to utilize three symmetrically located fibres 222. Furthermore, if the resin portion 228 is long enough a single detector fibre might suffice since the stripped modes lose their directional properties within a few centimeters due to scattering of the light within the resin 228. Once the light has scattered and is reasonably evenly dispersed in the resin 228 the scattered light can be detected by a single fibre. More detector fibres are required when the stripped modes are more directionally oriented.

With the just-described detector system adjustment of the connector can be achieved without having to monitor light energy at the end of the output fibre. Furthermore, this detector system can be used with any of the previously described embodiments of the invention. Additionally it lends itself to a fully automatic optical switch as as is basically shown in FIG. 10 since if permanently included with the switch and tied into the microcomputer it would provide a continuous indication of the accuracy of the selected tilt adjustment and could therefore be used as a feedback to the microcomputer which would in turn control the servomotors to adjust the screws appropriately until the optimum signal was being received by the selected output fibre.

The just described embodiment could be considered as a 1×2 optical switch, with one input fibre and two output fibres. The number of output fibres is determined by space limitations and thus the switch could be designated as a 1×N switch where N is the number of output fibres. An N×N switch could be devised using the embodiment of FIG 1 or that of FIG. 4 wherein the number of fibres associated with each base plate is N. In this embodiment an input signal on a fibre associated with one base plate could be transmitted across the connector to any selected output fibre associated with the other base plate, merely by adjusting the screws so that the signal travels the desired path. Signals could pass in either direction. This embodiment would be particularly effective with a microcomputer controlled servomotor system for controlling screw movement and would be facilitated by a feedback system such as described above.

Figure 12:
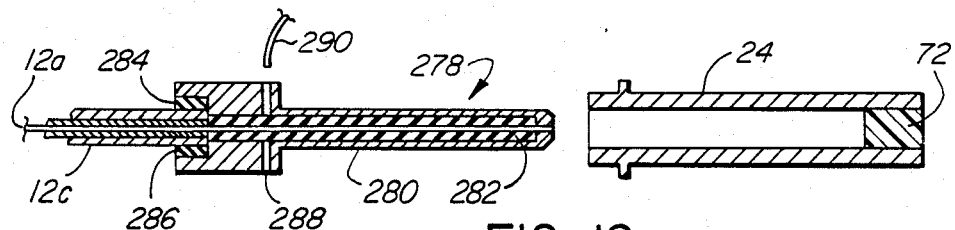

FIG. 12 shows an alternative detector system in conjunction with a structure such as was used with the first embodiment type of coupler. In this case lens holder 24 carries lens 72 and a fibre ferrule 278 is adapted for reception in the lens holder. In the ferrule a bare fibre 12a is held in the barrel 280 by a resin 282 having an index of refraction greater than that of the fibre's cladding and, preferably, a low light attenuation coefficient so that it will collect more light. The cable or sheath 12c is glued within an enlarged bore 284 of the ferrule as at 286 and a plurality, such as four, of radial bores 288 extend through the body of the ferrule to the resin 282. Optical detector fibres, such as 290, having a high numerical aperture to collect as much light as possible are inserted into the bores 288 to detect the stripped modes. The fibres 290 are in turn connected to a photodetector or monitor as in the previous embodiment whereby the amount of light in the resin 282 can be monitored and the coupler can then be adjusted to ensure that the desired amount of light is being transmitted to the receiving fibre. If the stripped modes have lost their directional sensitivity in the region of the bores 288 then only a single detector fibre 290 would be required as the stripped modes would be scattered reasonably uniformly through the resin 282.

5. Attenuators

Any of the embodiments heretofore and hereinafter described could be used as signal attenuators merely by adjusting the relative tilt angles of the input and output fibres so that the transmitted image is offset with respect to the receiving fibre, until the desired continuously variable signal strength is achieved. It is not always necessary, or desirable to have the strength of the transmitted signal as great as is possible.

The tilt principles of this invention result in a reduction of the back reflection which goes back to the transmitter fibre and this is important for state-of-the-art laser diodes which can become unstable if too much light is fed back to the laser diode cavity.

The attenuation techniques of the invention can be used with single or multi-mode fibres. They work especially well in single mode applications since the attenuation will not be mode dependent. The ability to attenuate eliminates the requirement for pigtail single mode attenuators as one can adjust the connector housing to achieve optimum coupling or attenuating as desired.

6. Options (i) If desired it would be possible to introduce secondary elements such as polarizors or neutral density filters into the connectors of the present invention. For example such devices could be mounted in threaded carriers similar to the lens holder 172 and threadedly introduced into the connector.

Figure 13:
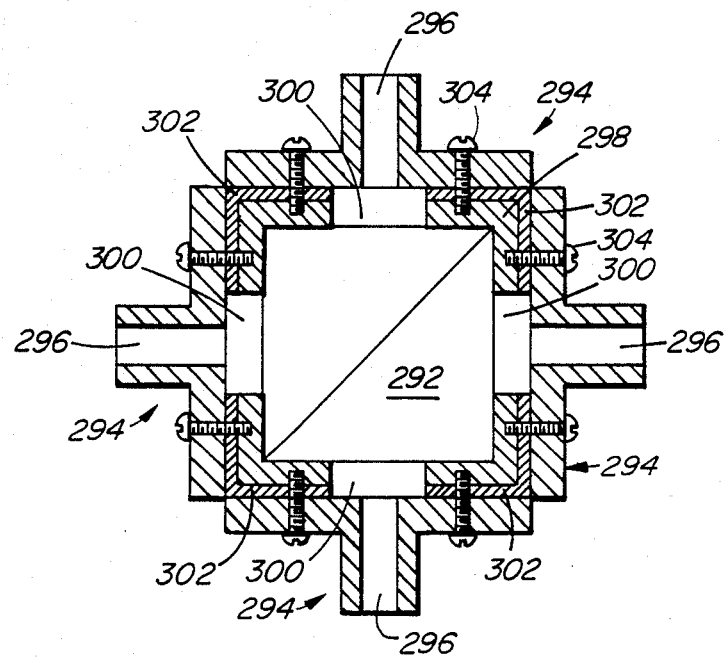
FIG. 13 shows a beam splitter using the principles of the present invention.

(ii) It would also be possible to use the principles of the present invention in apparatus such as a beam splitter as shown in FIG. 13. In this case the beam splitter 292 is surrounded by four base plates 294, shown only schematically since the type of base plate used could be of any type, including those of the embodiments of FIGS. 1-3 or 4-6. Each base plate 294 is intended to mount an appropriate lens holder and a fibre ferrule in its axial bore 296 and the details of such mounting need not be discussed here. The mounting chassis 298 for the beam splitter 292 provides an air gap 300 for each base plate and permits a resilient insert 302 to be positioned at each corner between the chassis 298 and the confronting face of the adjacent base plate 294. Fine pitch screws 304 clamp each base plate 294 to the chassis 298, passing through appropriate through holes (not shown) in the base plate and the resilient insert, and being received in a threaded bore in the chassis. Adjustment of the screws 304 can be performed as previously described in order to achieve the desired coupling of the fibres through the beam splitter.

(iii) It should also be mentioned that contrary to the foregoing descriptions it is not always necessary, or even possible, to have a fibre end butting against the adjacent lens. Abutment between a lens and a fibre end will occur only if the lens is exactly one-quarter the focal length of the lens. In practice it may be necessary to space the fibre end from the lens to ensure that the image passing through the lens is focussed on the fibre end. Any such space or gap between the fibre end and the lens can be filled with an index matching fluid or resin having a low attenuation coefficient to minimize losses.

7. Radial Adjustment (FIGS 14 and 15)

Figure 14:
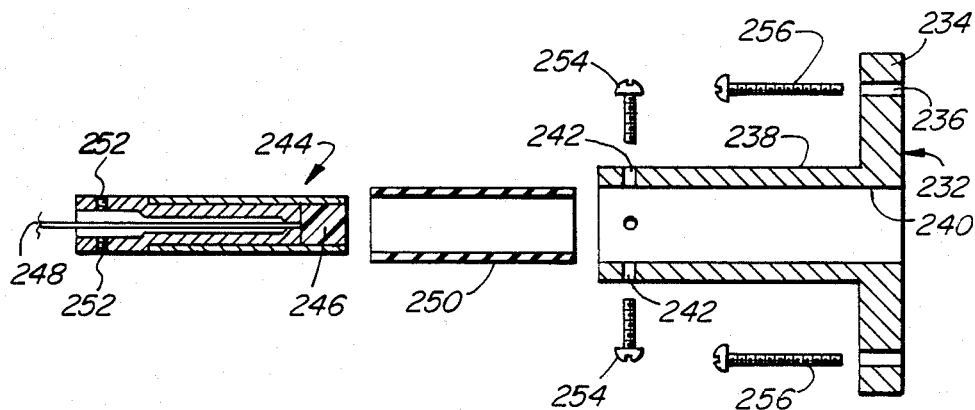
FIGS. 14 and 15 show two embodiments of a radially adjustable coupling device using the principles of the present invention.
Figure 15:
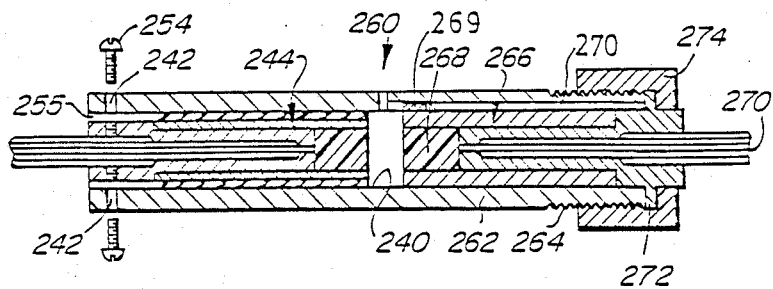

FIGS. 14 and 15 illustrate the use of the principles of tilt adjustment as applied to optical switches and couplers wherein the adjustment is performed by radially directed screws rather than by axially directed screws. Radially adjustable devices could be longer and cylindrically smaller than axially adjustable devices and could have particular use where axially adjustable devices could not be used due to size limitations.

FIG. 14 shows a simple base plate and fibre assembly combination as might be used in a bulkhead connector, one end connector, or an optical switch, analogous to the embodiments of FIGS. 8 and 10. In this case the base plate 232 has a small diameter flange 234 provided with circumferentially spaced apart bores 236. A boss 238 projects rearwardly from flange 234 and a central bore 240 extends the full length of the base plate. Four radially directed bores 242 positioned away from the flange 234 pass through the boss 238 into the bore 240.

A ferrule 244 is provided to mount a beam expanding or imaging lens 246 and a fibre 248 passes through the ferrule 244 to adjacent the lens 246. A spacer means such as resilient coating or covering 250 is applied to or slid onto the ferrule and radially directed threaded bores 252 ar provided in the ferrule as shown, the bores passing through the coating 250.

To assemble the unit the coated or covered ferrule 244 is slid into the bore 240 until the bores 252 align with the bores 242. Fine pitch screws 254 are passed through bores 242 and threaded into bores 252. Thereafter the unit is attached to a bulkhead or a mirror assembly (FIGS. 8,10) by mounting screws 256.

After connecting a suitable source and monitor to the unit the radially directed screws 254 can be rotated to move the end of the ferrule up, down or sideways (or any combination) so as to obtain the desired light transmission, whether maximum or otherwise. Since the ferrule 244 is covered with the resilient material the screw adjustments will cause the ferrule and its lens to tilt relative to the base plate to achieve the desired results.

The base plate 232 could be replaced by a lens holder such as was described with respect to FIGS. 1-3 which lens holder could then be keyed into a base plate and secured thereto by a suitable locking nut which leaves the screws 254 exposed for adjustment. Opposing base plates could be secured together and appropriate lens holders secured in the respective base plates to achieve a fibre-to-fibre connector having radial tilt properties. Since axial tilt is no longer required in this construction it would not be necessary to place a resilient member between the confronting base plate faces.

FIG. 15 shows the principles of radial adjustment as applied to another coupler 260. In this case one end of the coupler body 262 has radially directed bores 242 and can receive, in the longitudinal bore 240 thereof, a ferrule 244 constructed as in the embodiment of FIG. 14. At the other end the body 262 has an external thread 264 and receives a ferrule 266 in the bore 240. The ferrule 266 is simple, containing a suitable beam expanding or imaging lens 268 and an optical fibre 270. The ferrule 266 has a circumferential flange 272 which abuts the end of the connector body 262 and a nut 274 is provided to clamp the flange 272 against the end of body 262, thereby holding the ferrule 266 in a predetermined position.

With all of the components in place a suitable test signal can be sent along one of the fibres and monitored on the other side of the connector. Screws 254 are adjusted to tilt the ferrule 244, its lens and fibre until the monitored signal indicates that the desired signal strength is being transmitted through the connector. After adjustment the air gap 255 could be filled with epoxy resin to hold everything in adjustment.

The embodiments of FIGS. 14 and 15 show simple structures, analogous to the simplified embodiment of FIG. 1. It is understood, however, that suitable lens holders and adapters could be used to obtain other radially adjustable units, to fit into small laser diode or light emitting diode modules without departing from the spirit of the invention.

While not specifically shown it is clear that the arrangement for the adjusting screws need not be exactly as shown. For example the threaded holes 252 in the ferrule 244 could be eliminated and the through bores 242 in the housing could be threaded so that the screws are threadedly received in those bores and the ends of the screws bear against the outer surface of the ferrule (or the resilient coating). Adjustment of the ferrule would be accomplished in the same manner as previously described. Also the bores 242 through the housing (threaded or unthreaded) need not be adjacent the outer part of the housing (left end as in FIG. 15). They could be closer to the center, in the vicinity of the inner end of the ferrule as it is mounted in the housing.

Another modification of this invention, which should be clear from FIG. 15, would be the utilization of identical right and left hand ferrules with the same mounting mechanism used at each end. For example the left end ferrule could have a captured nut similar to nut 274 and the housing could be threaded as at 264. It would be necessary, of course, to have the adjusting screws positioned in the housing so as not to interfere with the nut after the ferrule is mounted in the housing. Preferably the ferrule 266 and the ferrule 244 will also include a key (not shown) similar to the key 42 shown in the embodiment of FIG. 1 for engagement with a keyway (not shown) in the housing 264 to ensure proper positioning and alignment of the ferrules in the housing.

As is readily apparent from the foregoing it is possible to execute the principles of the present invention in several different embodiments, with the adjustment step being performed either axially or radially relative to the fibres being optically coupled.

Figure 16:
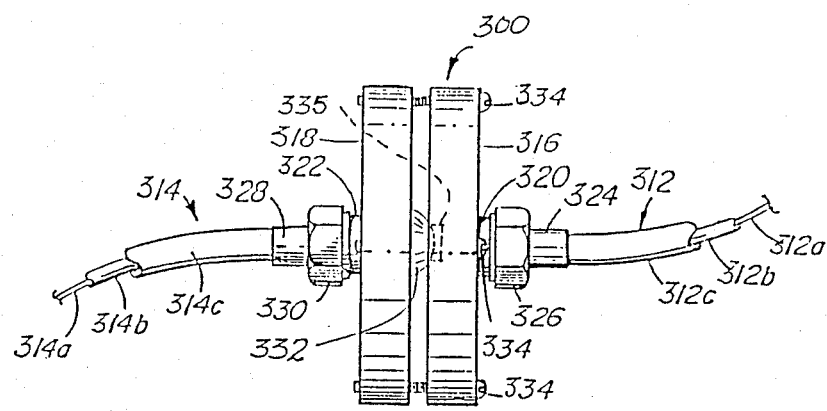
FIG. 16 shows an embodiment similar to that of FIG. 1 but using a hemispherical fulcrum about which tilt adjustment is possible.
Figure 17:
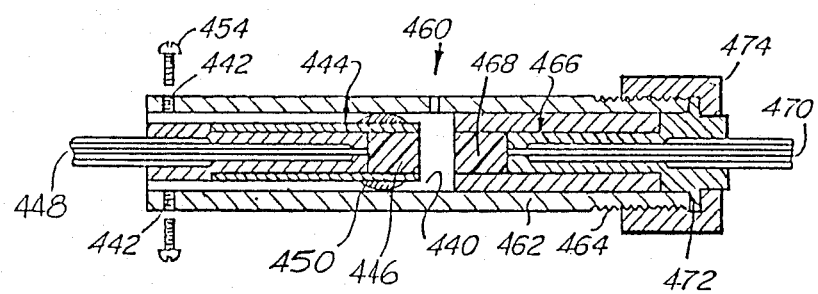
FIG. 17 shows an embodiment similar to that of FIG. 15 but using a spherical fulcrum member for tilt adjustment.
Figure 18:
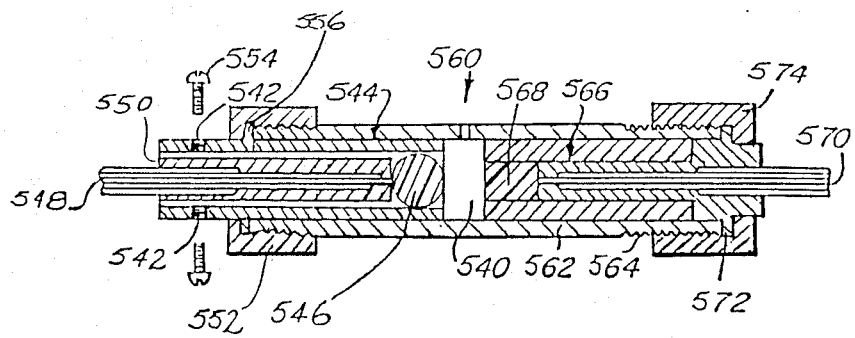
FIG. 18 shows an embodiment similar to that of FIG. 15 but using a spherical lens instead of a cylindrical lens.

Additional embodiments are envisioned as illustrated in FIGS. 16, 17 and 18 wherein a resilient member or coating is not required. The embodiment of FIG. 16 is similar to that of FIG. 1 while those of FIGS. 17 and 18 are similar to that of FIG. 15.

FIG. 16 illustrates a coupler 300 used to optically couple a pair of optical fibre assemblies 312, 314, which assemblies are essentially identical to the assemblies 12, 14 discussed previously. In this case the fibre assemblies are attached to base plates 316, 318 via nuts 326, 330 which are carried by the lens holders 324, 328 respectively and are threadedly engaged with the threaded bosses 320, 322 respectively.

As with the embodiment of FIG. 1 the base plate 316 is provided with circumferentially spaced-through bores adjacent the periphery thereof and the base plate 318 is provided with corresponding threaded bores adjacent the periphery thereof. Securing and adjusting means in the form of screws 334 pass through the bores in base plate 316 and are threadedly received in the threaded bores of base plate 318.

A fulcrum for the tilt adjustment of one base plate relative to the other is provided by a generally hemispherical protrusion or spacer 332 projecting from the face of one base plate, such as 318, towards the other base plate, such as 316. The protrusion 332 may be integral with the base plate 318 or it may be a separate component appropriately positioned as shown.

As illustrated, a portion of the protrusion is received in a cylindrical recess 335 of a smaller diameter provided in the obverse face of the other base plate. When the screws 334 are initially tightened the protrusion 332 will seat against the circular edge of the recess 334 and thus the two base plates will be radially located relative to each other. The screws can then be adjusted as described for the FIG. 1 embodiment so that one base plate can tilt relative to the other to optimize the light energy transmissable from one fibre and its lens to the other lens and its fibre.

With this embodiment it is desirable to have the respective GRIN lenses as close to each other as possible and thus the lens holder 328 should be able to be located within the base plate 318 such that its lens is at the outermost surface point of the protrusion 332. Similarly the lens of the lens holder 324 should be at the innermost surface of the recess 334.

It is evident that the tilt mechanism as just described operates as a "ball and socket" type of joint. Thus it would be obvious that the recess 334, instead of being cylindrical as shown, could be spherical to match the sphericity of the protrusion 332 and that the recess and/or the protrusion could be coated with a thin layer of a friction-reducing material such as polytetrafluorethylane. If the base plates 316 and 318 are moulded from suitable plastic material it may not be necessary to be concerned with friction or binding between the protrusion and the mating recess.

If hermeticity is required it would be possible to provide seals such as O-rings aroung the mating portions of the protrusion and the recess. Similarly a resilient washer such as item 32 illustrated in FIG. 1 could be used, with the protrusion 332 being positioned within the void area 50. Furthermore if optical fibre assemblies terminating in commerical connectors of the AMP or SMA types (for example) are to be used it would be possible to use the universal type of connector as shown in FIGS. 4 and 5 suitably modified to obtain the benefits of the "ball and socket" tilt mechanism as described above for FIG. 16.

FIG. 17 shows a radial connector 460 in which a first ferrule or lens holder 466 is located in one end of a housing 462 and is secured therein by way of a nut 474 engaging the flange 472 of the ferrule and the threads 464 of the housing. The fibre assembly 470 terminates at the beam expanding or imaging lens 468. As previously mentioned the ferrule 466 should have a key (not shown) for engagement with a keyway (not shown) in the housing to achieve repeatable and positive location within the housing.

A second ferrule 444 carrying a lens 446 and a fibre assembly 448 is positioned within the housing 462 from the other end thereof. In this instance a spacer in the form of an annular spherical member 450 is in tight fitting engagement with the ferrule 444 and also engages the inside surface of the housing. Threaded radial bores 442 pass through the housing and receive the securing and adjusting means in the form of adjusting screws 454, the ends of which screws can contact the ferrule 444 in a bearing manner. The screws 454 are individually adjustable to alter the angular orientation of the ferrule 444 relative to the housing 462 and the other ferrule 66 to optimize the optical signal passing from one fibre to the other.

In the embodiment of FIG. 18 the components 562, 564, 566, 568, 570, 572 and 574 correspond to the equivalent components of FIG. 16. The components at the other end, however, differ considerably in that a second ferrule 544 is mounted in the housing 562 by a threaded nut 552 which engages a flange 556 on the ferrule. A fibre holder 550 carries the fibre assembly 548 and terminates in a spherical lens 546 which is frictionally held within the ferrule and is welded to the central optical fibre. Threaded bores 542 pass through the ferrule 544 and receive threaded screws 554. The screws 554 center the fibre holder 550 and also serve to adjust the relative angle of the holder with respect to the ferrule 544 and the housing 562. The spherical lens 546 acts as a fulcrum for the tilting holder 550. Thus in this embodiment the optimal signal can pass from one fibre assembly to the other.

Figure 19:
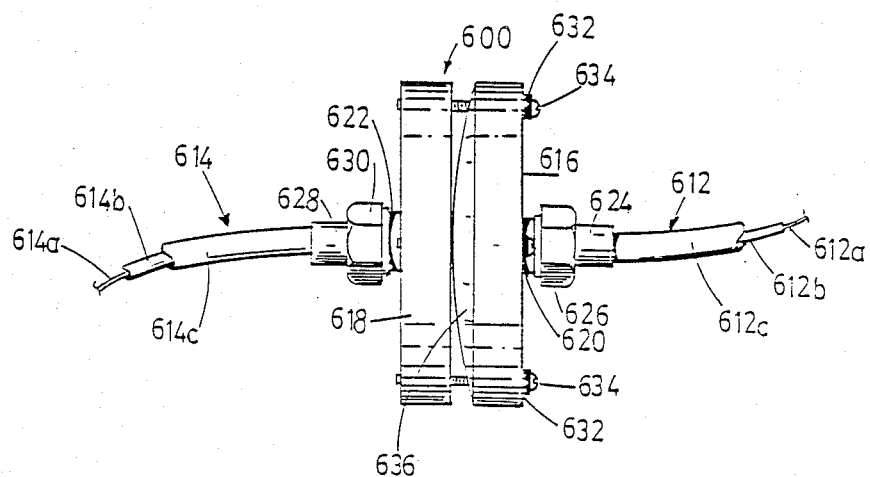
FIG. 19 shows another embodiment similar in some respects to that of FIG. 16.

FIG. 19 illustrates another coupler, 600, used to optically couple a pair of optical fibre assemblies 612,614, which assemblies are essentially identical to the assemblies 12,14 of FIG. 1. In this case the fibre assemblies are attached to base plates 616,618 via nuts 626,630 which are carried by lens holders 624,628 respectively and are threadedly engaged with the threaded bosses 620,622 respectively.

The embodiment of FIG. 19 differs from that of FIG. 1 in several respects. First of all the base plates 616,618 are not identical to each other. Base plate 618 is a standard base plate, similar to plate 18 or 318, whereas base plate 616 is formed with a spherical surface 636 which confronts the planar face of base plate 618 and thus acts as a fulcrum for the tilt adjustment of one base plate relative to the other.

The tilt adjustment is achieved, as with the other embodiments by securing and adjusting means in the form of screws 634 which pass through through bores adjacent the periphery of base plate 616 and are received in corresponding threaded bores adjacent the periphery of base plate 618. In this embodiment resilient means such as rubber washer, O-rings, Belleville washers, et cetera, are placed between the head of screw 634 and the rear face of base plate 616, the resilient means being depicted by reference number 632.

Adjustment of this embodiment is carried out in the same manner as with the previous embodiment of FIGS. 1 and 16 for example.

This embodiment has several advantages. For example the end separation losses are reduced since the lenses are physically very close to each other. Also, adjustment of the coupler is somewhat easier due to the resilient members being between the screw head and the base plate. When one screw 634 is tightened or loosened the other side of the base plate can move due to the resiliency of the members 634 and thus it is not necessary to loosen or tighten the opposite screw to achieve tilting movement of the base plates relative to each other.

As with the other embodiments one could effect several variations with this embodiment without detracting from the invention. The same principles could be used for a coupler as shown in FIG. 5 or for attenuators or other devices. Also, it would be possible to provide each base plate with a spherical surface such as 636 to increase the degree of adjustability available. Furthermore, the base plates 616,618 could have a square periphery (for example) rather than a circular periphery, depending on the particular location in which it is to be used. That possibility of course exists for the other embodiments as well.

Clearly the present invention provides a unique mechanism for coupling an optical fibre to another fibre or light source such that the joint can be disconnected and reconnected without any appreciable losses ensuing. The connector is inexpensive to manufacture and easy to use and represents a significant advance in the optical fibre art. While certain aspects of the invention have been described herein the invention is not limited only to what has been illustrated as there are undoubtedly many applications for the invention which can occur to a skilled workman without departing from the principles as described. The protection to be afforded this invention is to be determined from the scope of the claims appended hereto.

THE EMBODIMENTS OF THE INVENTION IN WHICH AN EXCLUSIVE PROPERTY OR PRIVILEGE IS CLAIMED ARE DEFINED AS FOLLOWS:

1. A coupling device for optically coupling a pair of optical fibres in end-to-end relation, each of said fibres terminating at a beam expanding or imaging lens, comprising: base means for each of said fibres, each such base means including an axial bore and means for securing one of said lenses therein; a resilient member positionable between confronting end faces of said base means, said resilient member permitting passage of light energy thereacross; and axially extending securing and adjusting means interconnecting said base means with said resilient member trapped therebetween; whereby said securing and adjusting means are individually axially displaceable to effect an angular adjustment of one base means relative to the other so as to optimize the light energy transmissable from one fibre and its lens to the other lens and its fibre.

2. The coupling device of claim 1 wherein said base means includes a circular base plate having a cylindrical boss projecting away from said plate, said axial bore extending through said boss and said base plate.

3. The coupling device of claim 2 wherein said boss is externally threaded and includes an axially extending keyway in the inner surface defining said axial bore.

4. The coupling device of claim 3 wherein each of said fibres terminates in a lens holder containing said lens, said lens holder including an axially extending external key matable with said keyway and a rotatable captured nut engageable with said externally threaded boss whereby said lens holder is receivable in said axial bore of said base means with said key engaging said keyway and said nut is engageable with said externally threaded boss to securely hold said lens holder within said axial bore.

5. The coupling device of claim 4 wherein said optical fibre includes a central clad optical core, a coating material surrounding said clad core, and an outer sheath surrounding said coating, the termination of the fibre including a fibre ferrule member which receives and holds the fibre therein and is receivable in said lens holder such that the end of said core is positionable adjacent said lens at a point where an image is formed by said lens.

6. The coupling device of claim 5 wherein said termination includes a short length of said clad core received in a first bore of an end face of said ferrule, an inner crimp sleeve surrounding a bared length of said coating adjacent said short length of core and received in an intermediate bore of said ferrule, and an outer crimp sleeve surrounding a length of said sheath adjacent said inner sleeve and received in a second bore of said ferrule, said inner and outer crimp sleeves being fixed within said intermediate and second bores respectively of said ferrule.

7. The coupling device of claim 2 or 3 wherein said securing and adjusting means includes a plurality of threaded screws circumferentially spaced apart adjacent the outer periphery of said base plates, each screw passing through a through bore in one base plate and an aligned through bore in said resilient member, and being receivable in a mating threaded bore in the other base plate.

8. The coupling device of claim 2 or 3 wherein said resilient member has a central void area hermetically sealed from the ambient surroundings, said securing and adjusting means including a plurality of threaded screws circumferentially spaced apart adjacent the outer periphery of said base plates, each screw passing through a through bore in one base plate and an aligned through bore in said resilient member, and being receivable in a mating threaded bore in the other base plate.

9. The coupling device of claim 2 or 3 wherein said resilient member is an annular spring, said securing and adjusting means including a plurality of threaded screws circumferentially spaced apart adjacent the outer periphery of said base plates, each screw passing through a through bore in one base plate, past said annular spring, and being receivable in a mating threaded bore in the other base plate.

10. The coupling device of claim 2 or 3 wherein said resilient member is a resilient annular O-ring captured between said opposing end faces to define an hermetically sealed void area across which said light energy can pass, said securing and adjusting means including a plurality of threaded screws circumferentially spaced apart adjacent the outer periphery of said base plates, each screw passing through a through bore in one base plate, past said O-ring, and being receivable in a mating threaded bore in the other base plate.

11. The coupling device of claim 4, 5 or 6 wherein said securing and adjusting means includes a plurality of threaded screws circumferentially spaced apart adjacent the outer periphery of said base plate, each screw passing through a through bore in one base plate, and an aligned through bore in said resilient member and being receivable in a mating threaded bore in the other base plate.

12. The coupling device of claim 4, 5 or 6 wherein said resilient member has a central void area hermetically sealed from the ambient surroundings, said securing and adjusting means including a plurality of threaded screws circumferentially spaced apart adjacent the outer periphery of said base plates, each screw passing through a through bore in one base plate, and an aligned through bore in said resilient member and being receivable in a mating threaded bore in the other base plate.

13. The coupling device of claim 4, 5 or 6 wherein said resilient member is an annular spring, said securing and adjusting means including a plurality of threaded screws circumferentially spaced apart adjacent the outer periphery of said base plates, each screw passing through a through bore in one base plate, past said annular spring, and being receivable in a mating threaded bore in the other base plate.

14. The coupling device of claim 4, 5 or 6 wherein said resilient member is a resilient annular O-ring captured between said opposing end faces to define an hermetically sealed void area across which said light energy can pass, said securing and adjusting means including a plurality of threaded screws circumferentially spaced apart adjacent the outer periphery of said base plates, each screw passing through a through bore in one base plate, past said O-ring, and being receivable in a mating threaded bore in the other base plate.

15. The coupling device of claim 1, 2 or 3 wherein said lens is a graded index lens.

16. The coupling device of claim 1, 2 or 3 wherein said resilient member is formed from materials selected from the group including rubbers, soft plastics and soft metals.

17. The coupling device of claim 2 or 3 wherein said resilient member comprises a plurality of individual spring members, said securing and adjusting means including a plurality of threaded screws circumferentially spaced apart adjacent the outer periphery of said base plates, each screw passing through a through bore in one base plate and a through bore in a corresponding one of said spring members, and being receivable in a mating threaded bore in the other base plate.

18. The coupling device of claim 4, 5 or 6 wherein said resilient member comprises a plurality of individual spring members, said securing and adjusting means including a plurality of threaded screws circumferentially spaced apart adjacent the outer periphery of said base plates, each screw passing through a through bore in one base plate and a through bore in a corresponding one of said spring members, and being receivable in a mating threaded bore in the other base plate.

19. A system for monitoring the transmitted light energy in a light receiving optical fibre included in a coupling device as defined in claim 5 comprising a transparent material surrounding a portion of the cladding of said fibre within said fibre furrule, said material having a higher index of refraction than said cladding and serving to capture light escaping from said cladding; at least one bore extending radially through said furrule and terminating at said material; a monitoring fibre held in said bore with its end in contact with said material; and monitoring means connected to said monitoring fibre to monitor the amount of light energy in said material, which amount provides an indication of the amount of light energy transmitted along said receiving fibre.

20. A coupling device for optically coupling a pair of optical fibres in end-to-end relation, each of said fibres being provided with a terminal connector at the end to be optically connected to the other fibre, comprising: base means for each of said fibres, each such base means including an axial bore therethrough; a lens holder for each base means, each lens holder containing a beam expanding or imaging lens and means for securing the lens holder within the axial bore of its base means; adapter means for each base means, each adapter means including means to matingly receive the terminal connector of the optical fibre associated therewith and to hold the terminal connector adjacent the lens held in an adjacent lens holder; a resilient member positionable between opposing end faces of said base means, said resilient member permitting passage of light energy thereacross; and axially extending securing and adjusting means interconnecting said base means with said resilient member trapped therebetween; whereby said securing and adjusting means are individually axially displaceable to effect an angular adjustment of one base means relative to the other so as to optimize the light energy transmissable from one fibre and its lens to the other lens and its fibre.

21. The coupling device of claim 20 wherein said base means includes a circular base plate having a cylindrical boss of a smaller diameter projecting away from said plate, said axial bore extending through said boss and said base plate.

22. The coupling device of claim 21 wherein said axial bore is internally threaded and each of said lens holders and adapters is externally threaded for reception in said threaded axial bore.

23. The coupling device of claim 22 wherein said resilient member includes a central void area hermetically sealed from the ambient surroundings and refraction index matching fluid is provided in said axial bores and said void area, between the lens holders held in the respective axial bores of said base means.

24. The coupling device of claim 20, 21 or 22 wherein each of said adapters includes an outwardly projecting externally threaded portion and each of said terminal connectors includes a rotatable nut captured thereon whereby with said terminal connector received in said adapter said nut may be threadedly engaged with the threaded portion of the adapter to secure the adapter to the terminal connector.

25. The coupling device of claim 23 wherein each of said adapters includes an outwardly projecting externally threaded portion and each of said terminal connectors includes a rotatable nut captured thereon whereby, with a resilient washer member in position against the end face of said threaded portion and said terminal connector received in said adapter, said nut may be threadedly engaged with the threaded portion of the adapter to sealingly secure the adapter to the terminal connector.

26. The coupling device of claim 21, 22 or 23 wherein said securing and adjusting means includes a plurality of threaded screws circumferentially spaced apart adjacent the outer periphery of said base plates, each screw passing through a through bore in one base plate and an aligned through bore in said resilient member, and being receivable in a mating threaded bore in the other base plate.

27. The coupling device of claim 21, 22 or 23 wherein said resilient member is an annular spring, said securing and adjusting means including a plurality of threaded screws circumferentially spaced apart adjacent the outer periphery of said base plates, each screw passing through a through bore in one base plate, past said annular spring, and being receivable in a mating threaded bore in the other base plate.

28. The connector of claim 21, 22 or 23 wherein said resilient member is a resilient annular O-ring captured between said opposing end faces to define an hermetically sealed void area across which said light energy can pass, said securing and adjusting means including a plurality of threaded screws circumferentially spaced apart adjacent the outer periphery of said base plates, each screw passing through a through bore in one base plate, past said O-ring, and being receivable in a mating threaded bore in the other base plate.

29. The connector of claim 20, 21 or 22 wherein said lens is a graded index lens.

30. The coupling device of claim 20, 21 or 22 wherein said resilient member is formed from materials selected from the group including rubbers, soft plastics and soft metals.

31. The coupling device of claim 21, 22 or 23 wherein said resilient member comprises a plurality of individual spring means, said securing and adjusting means including a plurality of threaded screws circumferentially spaced apart adjacent the outer periphery of said base plates, each screw passing through a through bore in one base plate and a through bore in a corresponding one of said spring members, and being receivable in a mating threaded bore in the other base plate.

32. A coupling device for optically coupling an optical fibre to a light energy source surrounded at least in part by a bulkhead through which said source can transmit light energy, said optical fibre terminating at a beam expanding or imaging lens, comprising: base plate means for said fibre, said base plate means including an axial bore and means for securing said lens therein; a resilient member positionable between confronting faces of said base plate means and said bulkhead, said resilient member permitting passage of light energy thereacross; and axially extending securing and adjusting means interconnecting said base plate means with said bulkhead with said resilient member trapped therebetween; whereby said securing and adjusting means are individually axially displaceable to effect an angular adjustment of said base plate means relative to the bulkhead so as to optimize the light energy transmissable from said source to said lens and said optical fibre.

33. An optical coupling device comprising: an input optical fibre and at least two output optical fibres positioned adjacent and parallel to said input fibre; a housing; means fixing said input and output fibres at one end of said housing; a beam expanding or imaging lens in said housing having one end positioned adjacent the ends of said fibres; a cavity in said housing adjacent the other end of said lens; a piezo-electric bending member held in said cavity and connected to separate voltage sources so as to effect electrically stimulated movement of said bending member in mutually orthogonal directions; and a mirror on said bending member facing said lens; whereby an optical signal transmitted by said input fibre is expanded by said lens and reflected by said mirror, said bending member being movable under appropriate electrical stimulation to position said mirror such that said optical signal is reflected to a predetermined one of said output fibres.

34. An optical coupling device comprising: an input optical fibre and at least two output optical fibres positioned adjacent and parallel to said input fibre; base means; means fixing said input and output fibres within said base means; means holding a beam expanding or imaging lens in said base means adjacent the ends of said fibres; a mirror support supporting a mirror; a resilient member positionable between confronting faces of said base means and said mirror support respectively; and axially extending securing and adjusting means interconnecting said base means and said mirror support with said resilient member trapped therebetween; whereby said securing and adjusting means are individually axially displaceable to effect an angular adjustment of said mirror relative to said base means such that an optical signal transmitted along said input fibre through said lens is reflected by said mirror to be received by a selected one of said output fibres.

35. The coupling device of claim 34 wherein each of said securing and adjusting means is connected to a servomotor controlled by a control means whereby automatic adjustment of said mirror to reflect said signal to the selected one of said output fibres is possible.

36. The coupling device of claim 35 wherein said control means includes a microcomputer and feedback means connected to said microcomputer to ensure repeatability of the positioning of said mirror in response to an adjustment command.

37. The coupling device of claim 36 wherein said feedback means includes: a material surrounding said output fibres having a higher index of refraction than the cladding thereof, said material serving to capture light escaping from said cladding; a holder for holding the ends of at least three symmetrically arranged fibres in abutment with said material; and monitoring means connected to said symmetrically arranged fibres to monitor the amount of light energy in said material and to provide a signal to said microcomputer; whereby said mirror may be adjusted to ensure that a desired amount of light energy is transmitted to the selected output fibre, the amount of light energy in said material providing an indication of the amount of light energy transmitted along said output fibre.

38. An optical coupling device comprising: a plurality of first parallel, symmetrically arranged optical fibres and a corresponding plurality of second parallel, symmetrically arranged optical fibres; first and second base means; first means fixing said first fibres within said first base means; second means fixing said second fibres within said second base means; first means holding a first beam expanding lens in said first base means adjacent the ends of said first fibres; second means holding a second beam expanding lens in said second base means adjacent the ends of said second fibres; a resilient member positionable between confronting faces of said first and second base means; and axially extending securing and adjusting means interconnecting said first and second base means with said resilient member trapped therebetween; whereby said securing and adjusting means are individually axially displaceable to effect an angular adjustment of one base means relative to the other base means such that an optical signal transmitted along a fibre associated with one of said base means can be directed to be received by a selected one of the fibres associated with the other of said base means.

39. The coupling device of claim 38 wherein each of said securing and adjusting means is connected to a servomotor controlled by a control means whereby automatic adjustment of said base means relative to each other is possible.

40. The coupling device of claim 38 wherein said control means includes a microcomputer and feedback means connected to said microcomputer to ensure repeatability of the automatic adjustment of said base means.

41. The coupling device of claim 40 wherein said feedback means includes, for each base means: a material surrounding the fibres associated with the base means and having a higher index of refraction than the cladding of said fibres, said material serving to capture light energy escaping from the cladding of any fibre; a holder for holding the ends of at least three symmetrically arranged fibres in abutment with said material; and monitoring means connected to said symmetrically arranged fibres to monitor the amount of light energy in said material and to provide a signal to said microcomputer; whereby said base means may be adjusted in response to said signal to ensure that a desired amount of light energy is transmitted from the one fibre to the selected other fibre, the amount of light energy in said material providing an indication of the amount of light energy transmitted along the selected other fibre.

42. A system for monitoring the transmitted light energy in a light receiving optical fibre included in a coupling device as defined in claim 1, 20 or 32 comprising a transparent material surrounding a portion of the cladding of said fibre, said material having a higher index of refraction than said cladding and serving to capture light escapting from said cladding; a holder for holding the ends of at least three symmetrically arranged fibres in abutment with said material; and monitoring means connected to said symmetrically arranged fibres to monitor the amount of light energy in said material, which amount provides an indication of the amount of light energy transmitted along said receiving fibre.

43. A coupling device for optically coupling a pair of optical fibres in end-to-end relation, each of said fibres terminating in a lens holder containing a beam expanding lens, comprising: a circular base plate for each of said fibres, each said plate having a first plane face, an obverse plane face, an externally threaded central boss projecting outwardly from said first face, a central bore extending axially through said boss and exiting at said obverse face, and a plurality of circumferentially spaced apart axially extending bores passing through the base plate adjacent the periphery thereof, the peripheral bores of one base plate being smooth and the peripheral bores of the other base plate being threaded; means for securing a lens holder in an appropriate one of said base plates, including a nut rotatably captured on the lens holder and mating key means in the central bore and on the lens holder whereby with the key means engaged so as to position said lens holder in the central bore the nut is threadedly engageable with the threaded boss to secure the lens holder stationary and in a predetermined position relative to the base plate; a resilient washer member positionable between and sealable to the obverse faces of the base plates, said washer member having a central void area to permit passage of light energy thereacross and a plurality of circumferentially spaced apart through holes alignable with corresponding peripheral bores of said said base plates; and a plurality of threaded screw members interconnecting said base plates with said washer member trapped between said obverse faces so as to hermetically seal said void area from the ambient surroundings; each screw member passing through a smooth peripheral bore of said one base plate and a corresponding through hole of said washer member, to be received in a corresponding threaded peripheral bore of the other base plate; whereby said screw members are individually rotatable to effect axial displacement and hence relative angular adjustment of said base plates so as to optimize the light energy transmissable from one fibre and its lens to the other lens and its fibre.

44. A coupling device for optically coupling a pair of optical fibres in end-to-end relation, each of said fibres including a commercial terminal connector having a rotatable nut captured thereon, comprising: a circular base plate for each of said fibres, each said plate having a first plane face, an obverse plane face, a central boss projecting outwardly from said first face, an internally threaded central bore extending axially through said boss and exiting at said obverse face, and a plurality of circumferentially spaced apart axially extending bores passing through the base plate adjacent the periphery thereof, the peripheral bores of one base plate being smooth and the peripheral bores of the other base plate being threaded; a lens holder for each base plate, each lens holder axially holding therein a beam expanding lens and being externally threaded for threaded reception in an appropriate one of said threaded central bores; an adapter member for each of said base plates, each adapter member being sized to receive a corresponding one of said terminal connectors therein and having a boss portion externally threaded for engagement with the nut captured on the terminal connector, each adapter member also having a larger diameter externally threaded portion for threaded reception in an appropriate one of said threaded central bores so that the terminal connector secured thereto is positioned adjacent an end face of a lens previously positioned in the central bore at a point when an image is formed by the lens; a resilient washer member positionable between and sealable to the obverse faces of the base plates, said washer member having a central void area to permit passage of light energy thereacross and a plurality of circumferentially spaced apart through holes alignable with corresponding peripheral bores of said base plates; and a plurality of threaded screw members interconnecting said base plates with said washer member trapped between said obverse faces so as to hermetically seal said void area from the ambient surroundings, each screw member passing through a smooth peripheral bore of said one base plate and a corresponding through hole of said washer member to be received in a corresponding threaded peripheral bore of the other base plate; whereby said screw members are individually rotatable to effect axial displacement and hence relative angular adjustment of said base plates so as to optimize the light energy transmissable from one fibre and its associated lens to the other lens and its associated fibre.

45. A method of optimizing the light energy transmissable from one optical fibre to another optical fibre within a coupling device holding said fibres generally in position for energy transmission therebetween, said coupling device including first and second housing means containing said fibres, beam expanding lens means in said housing means in association with said fibres, a resilient member, and securing and adjusting means interconnecting said housing means together with said resilient member trapped between confronting faces thereof, comprising the steps of: transmitting a test optical signal along said one fibre; monitoring the other fibre to determine the strength of the test signal received thereby; and adjusting said securing and adjusting means to alter the relative angular position of said housing means until the received signal is at the desired strength, thereby indicating that no further adjustment is required.

46. A method of optimizing the light energy transmissable from one optical fibre to another optical fibre within a coupling device holding said fibres generally in position for energy transmission therebetween, said coupling device including first housing means containing said fibres and beam expanding lens means adjacent the ends of said fibres, second housing means supporting a plane mirror, a resilient member, and securing and adjusting means interconnecting said first and second housing means together with said resilient member trapped between confronting faces thereof, comprising the steps of: transmitting an optical signal along said one fibre for reflection by said mirror towards the other fibre; monitoring the other fibre to determine the strength of the optical signal received thereby; and adjusting said securing and adjusting means to alter the relative angular position of said first and second housing means until the received signal is at the desired strength, thereby indicating that no further adjustment is required.

47. The method of claim 45 or 46 wherein said other fibre has a transparent material surrounding a portion of the cladding thereof, said material having a higher index of refraction than said cladding and serving to capture light escaping from said cladding, said monitoring step including the steps of securing at least one monitoring fibre so that an end thereof is in contact with said material and connecting the other end of said monitoring fibre to a monitor.

48. A coupling device for optically coupling a pair of optical fibres in end-to-end relation, each of said fibres terminating adjacent a beam expanding lens, comprising: elongated cylindrical housing means having an externally threaded portion at one end and a plurality of circumferentially spaced apart radially directed through bores at the other end; first ferrule means mounting one of said fibres and an associated lens and carrying nut means engageable with said threaded portion to secure said first ferrule means within said housing means at a predetermined position therein; second ferrule means mounting the other of said fibres and an associated lens, said second ferrule means having a resilient covering thereon and having a plurality of circumferentially spaced apart threaded bores at the end opposite the lens carried thereby, each of said threaded bores being alignable with a corresponding one of said through bores when said second ferrule means is positioned within said housing means; and radially extending securing and adjusting means extending through said through bores for engagement with said threaded bores; whereby said securing and adjusting means are individually radially displaceable to effect an angular adjustment of said second ferrule means relative to said housing and first ferrule means so as to optimize the light energy transmissable from one fibre and its lens to the other lens and its fibre.

49. A coupling device for optically connecting an optical fibre to a light energy source surrounded at least in part by a bulkhead through which said source can transmit light energy, comprising: housing means securable to said bulkhead and including a cylindrical portion extending away from said bulkhead generally in alignment with the path of said light energy, said cylindrical portion including a plurality of circumferentially spaced apart radially directed through bores adjacent the end opposite said bulkhead; ferrule means mounting said fibre and an associated beam expanding lens adjacent the end of said fibre, said ferrule means having a resilient covering thereon and having a plurality of circumferentially spaced apart threaded bores at the end opposite said lens, each of said threaded bores being alignable with a corresponding one of said through bores when said ferrule means is positioned in said cylindrical portion; and radially extending securing and adjusting means extending through said through bores for engagement with said threaded bores; whereby said securing and adjusting means are individually displaceable to effect an angular adjustment of said ferrule means relative to said housing means so as to optimize the light energy transmissable from said source to said lens and optical fibre.

50. A method of optimizing the light energy transmissable to an optical fibre within a coupling device holding said fibre generally in position for energy transmission thereto, said coupling device including means holding said fibre and beam expanding lens means adjacent an end of said fibre, housing means containing said holding means, resilient means between said holding means and said housing means, and securing and adjusting means interconnecting said housing and holding means with said resilient means trapped therebetween, comprising the steps of: transmitting a test optical signal for reception by said optical fibre; monitoring said fibre to determine the strength of the test signal received thereby; and adjusting said securing and adjusting means to alter the angular position of said holding means relative to said housing means until the received signal is at the desired strength, thereby indicating that no further adjustment is required.

51. The method of claim 45, 46 or 50 wherein the desired strength of said received signal is less than the maximum strength of the received signal obtainable within said coupling device whereby said coupling device is usable as an optical signal attenuator.

52. An optical beam splitter comprising a rectangular beam splitter support having a diagonally disposed beam splitter mirror mounted therein; a support member on each side of said beam splitter support, each support member permitting optical access through an opening thereof to said mirror; a resilient member on each support member; a base plate on each resilient member; securing and adjusting means extending through each base plate and its associated resilient member for reception in its associated support member; and boss means on each base plate for mounting, adjacent said access opening, an optical fibre terminating adjacent a beam expanding or imaging lens; whereby securing and adjusting means are individually axially adjustable to alter the angular position of each base plate relative to said beam splitter support so as to obtain the desired signal strength at each receiver fibre of an optical signal entering said beam splitter from a transmitter fibre.

53. A coupling device for optically coupling a pair of optical fibres in end-to-end relation, each of said fibres terminating adjacent a beam expanding lens, comprising: elongated cylindrical housing means; first ferrule means mounting one of said fibres and an associated lens and having means engageable with said housing means to secure said first ferrule means within said housing means at a predetermined position therein; second ferrule means mounting the other of said fibres and an associated lens, said second ferrule means having spacer means thereon and being positionable within said housing means with the lens thereof adjacent the lens of said first ferrule means and said spacer means in engagement with an interior surface of said housing means; and radially extending securing and adjusting means extending through said housing means for engagement with said second ferrule means adjacent one end thereof; whereby said securing and adjusting means are individually displaceable to effect angular adjustment of said second ferrule means relative to said housing means and said first ferrule means so as to optimize the light energy transmissable from one fibre and its lens to the other lens and its fibre.

54. The device of claim 53 wherein said spacer means is a resilient coating on said second ferrule means.

55. The device of claim 54 wherein said housing means includes a plurality of circumferentially spaced apart threaded bores therethrough and each of said securing and adjusting means is a threaded screw receivable in a corresponding one of said bores for bearing engagement with said second ferrule means.

56. The device of claim 53, 54 or 55 wherein said housing means has an externally threaded portion at each end and each of said ferrule means carries a nut for threaded engagement with a corresponding one of the threaded portions on the housing means.

57. The device of claim 53, 54, or 55, wherein said spacer means is a spherical member through which said second ferrule means passes, said spherical member being receivable within said housing means and serving as a fulcrum for said second ferrule means.

58. A coupling device for optically coupling a pair of optical fibres in end-to-end relation, each of said fibres terminating at a beam expanding or imaging lens, comprising: base means for each of said fibres, each such base means including an axial bore and means for securing one of said lenses therein; spacer means between confronting faces of said base means, said spacer means permitting passage of light therethrough and permitting the tilting of one base means relative to the other; and axially extending securing and adjusting means interconnecting said base means with said spacer means therebetween; whereby said securing and adjusting means are individually axially displaceable to effect an angular adjustment of one base means relative to the other so as to optimize the light energy transmissable from one fibre and its lens to the other lens and its fibre.

59. The device of claim 58 wherein said spacer means comprises an hemispherical protrusion projecting from the confronting face of one base means, an outer portion of said protrusion being seatingly receivable in a recess provided in the confronting face of the other base means.

60. The device of claim 59 wherein said recess is circular with a diameter smaller than the diameter of said protrusion.

61. The device of claim 59 wherein said recess is spherical and matches the sphericity of said protrusion.

62. The device of claim 60 or 61 including sealing means positioned between said protrusion and said recess.

63. The device of claim 58 or 59 wherein said securing and adjusting means includes a plurality of threaded screws circumferentially spaced apart adjacent the outer periphery of said device, each screw passing through a through bore in one base means and being receivable in a mating threaded bore in the other base means.

64. The device of claim 58 wherein the confronting face of at least one of said base means is formed as a generally spherical surface, said surface constituting said spacer means.

65. The device of claim 64 wherein said securing and adjusting means includes a plurality of threaded screws spaced apart adjacent the outer periphery of said device, each screw passing through a through bore in one base means and being receivable in a mating threaded bore in the other base means.

66. The device of claim 65 including a resilient member captured between the head of each screw and the adjacent surface of said one base means.

67. A method of optimizing the light energy transmissable from a light source to an optical fibre within a coupling device holding said fibre generally in position for energy transmission thereto, said coupling device including cylindrical housing means, ferrule means mounting said fibre and a beam expanding lens adjacent an end of said fibre, resilient means between said ferrule means and an interior surface of said housing means, and radially extending securing and adjusting means extending through said housing means for engagement with said ferrule means, comprising the steps of: transmitting light energy from said source for reception by said optical fibre; monitoring said fibre to determine the strength of the transmitted energy received thereby; and adjusting said securing and adjusting means to alter the angular position of said ferrule means relative to said housing means until the received energy is at the desired strength, thereby indicating that no further adjustment is necessary.

68. The method of claim 67 wherein the desired strength of the received energy is less than the maximum strength of the received energy obtainable within the device whereby the device is usable as an optical signal attenuator.

69. The method of claim 67 or 68 wherein said light source includes a second optical fibre terminating in a beam expanding lens and held in said housing means in a predetermined position.

* * * * *